United States Patent
Kirsch

(10) Patent No.: US 7,206,814 B2
(45) Date of Patent: Apr. 17, 2007

(54) METHOD AND SYSTEM FOR CATEGORIZING AND PROCESSING E-MAILS

(75) Inventor: Steven T. Kirsch, Los Altos Hills, CA (US)

(73) Assignee: Propel Software Corporation, San Jose, CA (US)

( * ) Notice: Subject to any disclaimer, the term of this patent is extended or adjusted under 35 U.S.C. 154(b) by 567 days.

(21) Appl. No.: 10/683,598

(22) Filed: Oct. 9, 2003

(65) Prior Publication Data

US 2005/0080856 A1   Apr. 14, 2005

(51) Int. Cl.
*G06F 15/16* (2006.01)
(52) U.S. Cl. ............................ 709/206; 709/217
(58) Field of Classification Search ........ 709/200–207, 709/217–227
See application file for complete search history.

(56) References Cited

U.S. PATENT DOCUMENTS

| | | | |
|---|---|---|---|
| 5,619,648 A | 4/1997 | Canale et al. ............ 395/200.01 |
| 6,058,168 A * | 5/2000 | Braband .................... 379/93.24 |
| 6,182,118 B1 | 1/2001 | Finney et al. |
| 6,275,850 B1 | 8/2001 | Beyda et al. ................ 709/206 |
| 6,321,267 B1 | 11/2001 | Donaldson .................. 709/229 |
| 6,330,590 B1 | 12/2001 | Cotten ........................ 709/206 |
| 6,356,935 B1 | 3/2002 | Gibbs |
| 6,366,950 B1 | 4/2002 | Scheussler et al. |
| 6,421,709 B1 | 7/2002 | McCormick et al. |
| 6,453,327 B1 | 9/2002 | Nielsen ....................... 707/500 |
| 6,460,050 B1 | 10/2002 | Pace et al. ............... 707/104.1 |
| 6,643,686 B1 | 11/2003 | Hall |
| 6,691,156 B1 | 2/2004 | Drummond et al. ........ 709/206 |
| 6,757,830 B1 | 6/2004 | Tarbotton et al. ........... 713/188 |
| 6,769,016 B2 | 7/2004 | Rothwell et al. ........... 709/206 |
| 6,868,498 B1 * | 3/2005 | Katsikas ...................... 726/14 |
| 6,957,259 B1 * | 10/2005 | Malik ......................... 709/225 |

(Continued)

OTHER PUBLICATIONS

Website printout: MailFrontier, "Metador Overview", 2003, 1 page.

(Continued)

*Primary Examiner*—Moustafa M. Meky
(74) *Attorney, Agent, or Firm*—Schneck & Schneck; Thomas Schneck; Nissa M. Strottman

(57) ABSTRACT

An e-mail filtering method and system that categorize received e-mail messages based on information about the sender. Data about the sender is contained in the message and is used to identify the actual sender of the message using a signature combining pieces of information from the message header or derived from information in the message header. This and other information about the message is then sent by each member of an e-mail network to one or more central databases (in one embodiment, the information will also be stored at a database associated with the recipient's e-mail program and filtering software) which stores the information and compiles statistics about e-mails sent by the sender to indicate the likelihood that the e-mail is unsolicited and determine the reputation of the sender (a good reputation indicates the sender does not send unwanted messages while a bad reputation indicates the sender sends unsolicited e-mail messages). Information from the central database is then sent to recipients in order to determine the likelihood that a received e-mail message is spam (information may also be obtained from the local database associated with the recipient's e-mail program and filtering software).

78 Claims, 8 Drawing Sheets

U.S. PATENT DOCUMENTS

| | | | |
|---|---|---|---|
| 6,996,606 B2 * | 2/2006 | Hasegawa | 709/206 |
| 7,016,939 B1 * | 3/2006 | Rothwell et al. | 709/206 |
| 2002/0116463 A1 * | 8/2002 | Hart | 709/206 |
| 2003/0023692 A1 * | 1/2003 | Moroo | 709/206 |
| 2003/0126218 A1 * | 7/2003 | Sakonsaku | 709/206 |
| 2003/0149726 A1 * | 8/2003 | Spear | 709/206 |
| 2003/0233418 A1 * | 12/2003 | Goldman | 709/206 |
| 2004/0068542 A1 | 4/2004 | Lalonde et al. | |
| 2004/0177120 A1 | 9/2004 | Kirsch | 709/206 |
| 2004/0221016 A1 * | 11/2004 | Hatch et al. | 709/207 |
| 2005/0015455 A1 * | 1/2005 | Liu | 709/207 |
| 2005/0094189 A1 * | 5/2005 | Aoyama et al. | 358/1.15 |
| 2006/0015942 A1 * | 1/2006 | Judge et al. | 726/24 |
| 2006/0031314 A1 * | 2/2006 | Brahms et al. | 709/206 |

OTHER PUBLICATIONS

Website printout: Cloudmark, "Spamnet Authority", 2003, 1 page.
Website printout: MailShell, "SpamCatcher is the Easiest Solution to Spam", 2003, 2 pages.

\* cited by examiner

50 ⟶

84 — Received: from mail.domainone.com (mail.domaineone.com [111.22.3.444])
     by host.domaintwo.com with SMPT id 12345678 for
     <recipient@domaintwo.com>; Fri, 21 Feb 2003 19:20:23 -0800        54
52 — Received: from localhost.domainone.com (localhost[456.12.3.123]) by
     mail.domainone.com with SMTP id 4903u495;
     Fri, 21 Feb 2003 19:18:06 -0800                                   166
76 — Message-Id: <abc1234567@mail.domainone.com>
80 — X-Mailer: Internet Mail Service — 164
68 — Date: Fri, 21 Feb 2003 19:17:57 -0800 — 160
70 — From: Joe Sender <sender@domainone.com>
     To: recipient@domaintwo.com

58 — Received: from host.domaintwo.com (host.domaintwo.com [123.45.6.789])
     by host.domainthree.com with SMPT id 87654321 for
     <recipient@domainthree.com>; Fri,                                 62
     21 Feb 2003 19:21:00 -0800
86 — Received: from mail.domainone.com (mail.domainone.com [111.22.3.444])
     by host.domaintwo.com with SMTP id 12345678; Fri,
     21 Feb 2003 19:20:23 -0800
90 — Received: from localhost.domainone.com (localhost[456.12.3.123]) by
     mail.domainone.com with SMTP id 4903u495, Fri,
     21 Feb 2003 19:18:06 -0800                                        168
78 — Message-Id: <abc1234567@mail.domainone.com>
82 — X-Mailer: Internet Mail Service — 126
72 — Date: Fri, 21 Feb 2003 19:17:57 -0800 — 162
74 — From: Joe Sender <sender@domainone.com>
     To: recipient@domaintwo.com

*Fig. 3B (Prior Art)*

Joe Sender|111.22.3.444

*Fig. 5A* sender@domainone.com|Joe Sender|111.22.3.444

*Fig. 5B*

METHOD AND SYSTEM FOR CATEGORIZING AND PROCESSING E-MAILS

TECHNICAL FIELD

This invention relates to data communications and, in particular, to processing e-mail messages.

BACKGROUND ART

The proliferation of junk e-mail, or "spam," can be a major annoyance to e-mail users who are bombarded by unsolicited e-mails that clog up their mailboxes. While some e-mail solicitors do provide a link which allows the user to request not to receive e-mail messages from the solicitors again, many e-mail solicitors, or "spammers," provide false addresses so that requests to opt out of receiving further e-mails have no effect as these requests are directed to addresses that either do no exist or belong to individuals or entities who have no connection to the spammer.

It is possible to filter e-mail messages using software that is associated with a user's e-mail program. In addition to message text, e-mail messages contain a header having routing information (including IP addresses), a sender's address, recipient's address, and a subject line, among other things. The information in the message header may be used to filter messages. One approach is to filter e-mails based on words that appear in the subject line of the message. For instance, an e-mail user could specify that all e-mail messages containing the word "mortgage" be deleted or posted to a file. An e-mail user can also request that all messages from a certain domain be deleted or placed in a separate folder, or that only messages from specified senders be sent to the user's mailbox. These approaches have limited success since spammers frequently use subject lines that do not indicate the subject matter of the message (subject lines such as "Hi" or "Your request for information" are common). In addition, spammers are capable of forging addresses, so limiting e-mails based solely on domains or e-mail addresses might not result in a decrease of junk mail and might filter out e-mails of actual interest to the user.

"Spam traps," fabricated e-mail addresses that are placed on public websites, are another tool used to identify spammers. Many spammers "harvest" e-mail addresses by searching public websites for e-mail addresses, then send spam to these addresses. The senders of these messages are identified as spammers and messages from these senders are processed accordingly. More sophisticated filtering options are also available. For instance, Mailshell™ SpamCatcher works with a user's e-mail program such as Microsoft Outlook™ to filter e-mails by applying rules to identify and "blacklist" (i.e., identifying certain senders or content, etc., as spam) spam by computing a spam probability score. The Mailshell™ SpamCatcher Network creates a digital fingerprint of each received e-mail and compares the fingerprint to other fingerprints of e-mails received throughout the network to determine whether the received e-mail is spam. Each user's rating of a particular e-mail or sender may be provided to the network, where the user's ratings will be combined with other ratings from other network members to identify spam.

Mailfrontier™ Matador™ offers a plug-in that can be used with Microsoft Outlook™ to filter e-mail messages. Matador™ uses whitelists (which identify certain senders or content as being acceptable to the user), blacklists, scoring, community filters, and a challenge system (where an unrecognized sender of an e-mail message must reply to a message from the filtering software before the e-mail message is passed on to the recipient) to filter e-mails.

Cloudmark distributes SpamNet, a software product that seeks to block spam. When a message is received, a hash or fingerprint of the content of the message is created and sent to a server. The server then checks other fingerprints of messages identified as spam and sent to the server to determine whether this message is spam. The user is then sent a confidence level indicating the server's "opinion" about whether the message is spam. If the fingerprint of the message exactly matches the fingerprint of another message in the server, then the message is spam and is removed from the user's inbox. Other users of SpamNet may report spam messages to the server. These users are rated for their trustworthiness and these messages are fingerprinted and, if the users are considered trustworthy, the reported messages blocked for other users in the SpamNet community.

Spammers are still able to get past many filter systems. Legitimate e-mail addresses may be harvested from websites and spammers may pose as the owners of these e-mail addresses when sending messages. Spammers may also get e-mail users to send them their e-mail addresses (for instance, if e-mail users reference the "opt-out" link in unsolicited e-mail messages), which are then used by the spammers to send messages. In addition, many spammers forge their IP address in an attempt to conceal which domain they are using to send messages. One reason that spammers are able to get past many filter systems is that only one piece of information, such as the sender's e-mail address or IP address, is used to identify the sender; however, as noted above, this information can often be forged and therefore screening e-mails based on this information does not always identify spammers.

Many of the anti-spam solutions focus on the content of the messages to determine whether a message is spam. Apart from whitelists and blacklists, which use e-mail addresses which, as noted above, are easily forged, most anti-spam solutions do not focus on sender information. This approach is potentially extremely powerful since some sender information is extremely difficult to forge. Therefore, an e-mail filtering system which makes decisions based on difficult-to-forge sender information could be more effective than a content-based solution since minor changes to a message's content could be sufficient to get the message past a content-based filter. In contrast, a sender-based filter would be difficult to fool since filtering decisions are based on information is difficult to forge or modify.

Therefore, there is a need for an effective approach to filtering unwanted e-mails based on sender information.

SUMMARY OF THE INVENTION

This need has been met by an e-mail filtering method and system that categorize received e-mail messages based on information about the sender. A sender of a message may be either the individual sending the message or the machine(s) that forwarded the message. The sender may be identified in various ways based on single or combined pieces of information in the message header. For instance, the sender could be identified by an e-mail address, a single IP address, a range of IP addresses, an IP address used with a certain domain name, a range of IP address combined with a certain domain name, etc.

In one embodiment of the invention, data about the sender which is contained in the message is used to identify the actual sender by a signature either combining pieces of information from the message header or combining a range of IP addresses and information from the message header. Other ways of identifying the sender include using the final IP address used by the sender, the final domain name used by the sender, and/or the IP path used to send the message. This and other information about the message is then sent by each member of an e-mail network to one or more central databases (in one embodiment, the information will also be stored at a database associated with the recipient's e-mail program and filtering software) which stores the information and compiles statistics about e-mails sent by the sender to indicate the likelihood that the e-mail is unsolicited and determine the reputation of the sender (a good reputation indicates the sender does not send unwanted messages while a bad reputation indicates the sender sends unsolicited e-mail messages). Information from the central database is then sent to recipients in order to determine the likelihood that a received e-mail message is spam (information may also be obtained from the local database associated with the recipient's e-mail program and filtering software).

In one embodiment, scores may be calculated, based on the information from the central database, and applied to messages in a recipient's spam folder to give the user an indication of the probability that a message is junk mail. In another embodiment, a list of "good" senders, i.e., senders with good reputations, is created based on the compiled statistics. Messages from good senders are allowed through the e-mail filter while messages from senders whose reputations are bad or unknown are not allowed through the filter. In another embodiment, recipients' spam folders are monitored periodically to determine whether a sender's reputation has changed sufficiently to merit the release of the message from the spam folder; if the reputation has changed sufficiently so that the sender now has a positive reputation, the message is automatically released from the spam folder.

BRIEF DESCRIPTION OF THE DRAWINGS

FIG. 3a is an e-mail message header.

FIG. 3b is an e-mail message header.

FIG. 5a shows an identification of the actual sender in accordance with one embodiment of the invention.

FIG. 5b shows an identification of the actual sender in accordance with one embodiment of the invention.

DESCRIPTION OF THE INVENTION

Figure 1:
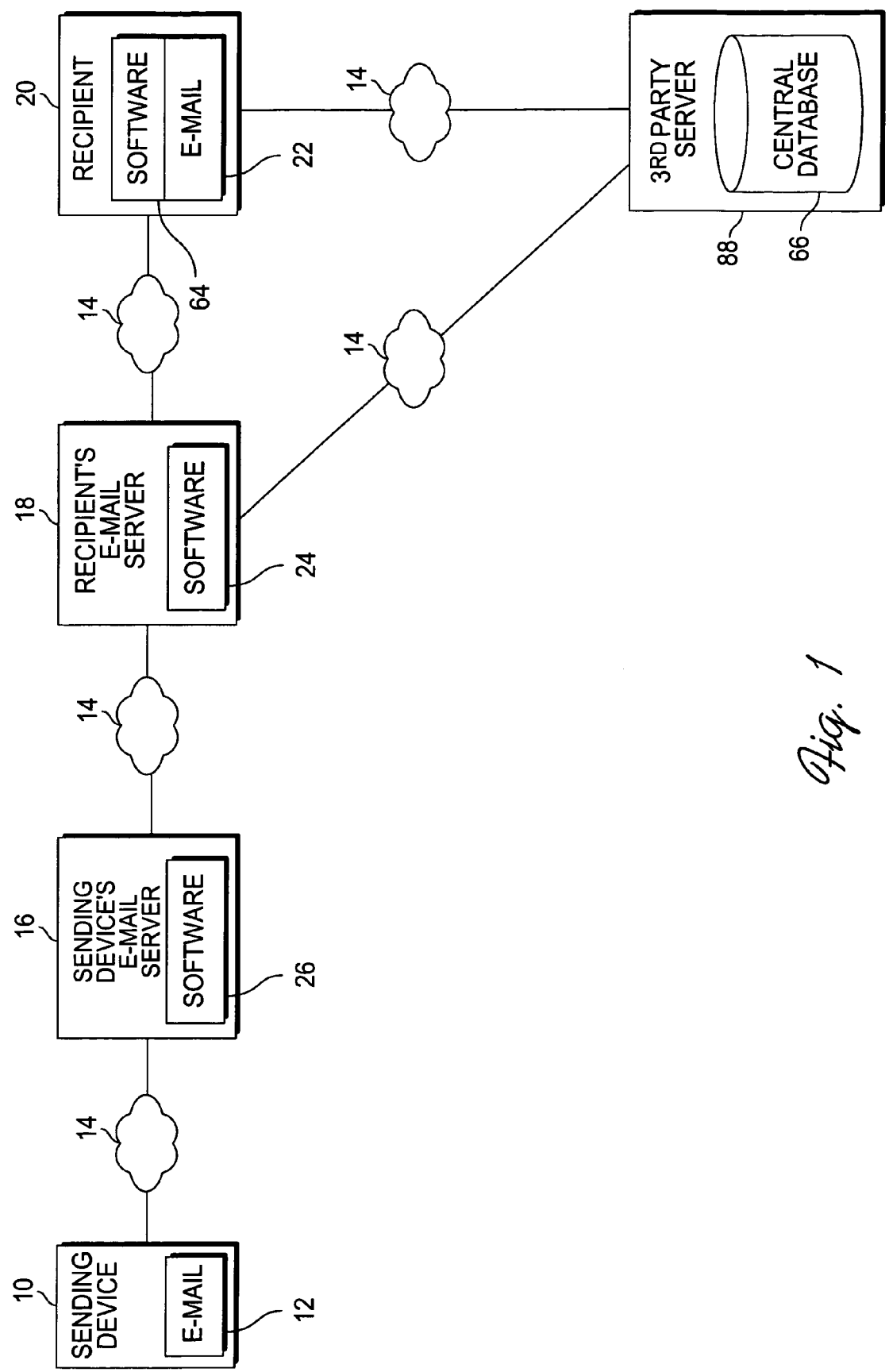
FIG. 1 is a block diagram of the network environment in which one embodiment of the invention operates.

With reference to FIG. 1, one embodiment of the invention has a sending device 10, for instance, a personal computer though the sending device could be any computer device capable of sending messages in a network, which is running an e-mail software program 12, such as Outlook™, Eudora™, etc. (The sending device 10 is operated by a user.)

The sending device 10 is connected to the sending device's e-mail server 16 via a network 14, such as the Internet. The sending device's e-mail server 16 is running software 26 for handling e-mail messages sent by the sending device 10. SMTP is generally used to send messages, while another protocol such as POP3 or IMAP is used for receiving messages; these protocols may run on different servers and the sending device's 10 e-mail program 12 generally specifies both an SMTP server or a POP3 or IMAP server for handling messages. The sending device's 10 e-mail messages are sent through a network 14 from the sending device's e-mail server 16 to the recipient's e-mail server 18. The recipient's e-mail server 18 is running software 24 to handle incoming messages and relay them, via a network 14 connection, to the recipient's 20 e-mail program 22 such as Outlook™, Eudora™, etc. The recipient 20 in this embodiment is a personal computer though in other embodiments it could be any computer device capable of receiving messages. (As with the sending device, the recipient may be operated by a user.) Filtering software 64 is associated with the recipient's 20 e-mail program 22. In other embodiments, the filtering software may be located at the recipient's e-mail server 18 or at another device in the network. In some embodiments, the recipient device has a database associated with the filtering software 64. The recipient 20 is a member of an e-mail network consisting of other e-mail users employing the same approach to filtering e-mail messages. A central database 66 stores information and compiles statistics about e-mail messages and their senders (a sender may be either an individual sending an e-mail message or the machine(s) that forwarded the message. (As will be discussed in greater detail below, there may be more than one database in other embodiments; each database would store different types of information. The separate databases are not necessarily stored on the same machine but would be maintained by a central server.) This information and the statistics are used to assess a sender's reputation for sending unsolicited e-mail (discussed below in FIGS. 2, 6, and 7). Software for managing the database and managing the e-mail network is associated with the database. In this embodiment, the database 66 is located at a third party server 88 which may be accessed over the network 14 by software 24, 64 at both the recipient's e-mail server 18 and the recipient 20. In other embodiments the central database 66 may be located elsewhere in the network 14, such as at the recipient's e-mail server 18 or in direct connection with the recipient's e-mail server 18. The central database 66 receives updates about e-mail messages and information about senders sent at intervals by e-mail users, such as the recipient 20, within the e-mail network. (In embodiments employing separate databases, the updates and information are received at the central server, which then sends the received material out to the appropriate databases.) This information is normally sent after installation and when a new message is categorized. Updates also may be sent by the users (via the software 64 at their computers) either at regular, programmed intervals (for instance, every hour, though another time interval may be specified by the user or system administrator in other embodiments) or at irregular intervals as determined by the user. Information from the central database 66 (or databases) may be sent to recipients 20 either at regular intervals (for instance, every hour, though another time interval may be specified by the user or system administrator in other embodiments) or in response to a request from the recipient 20.

Figure 2:
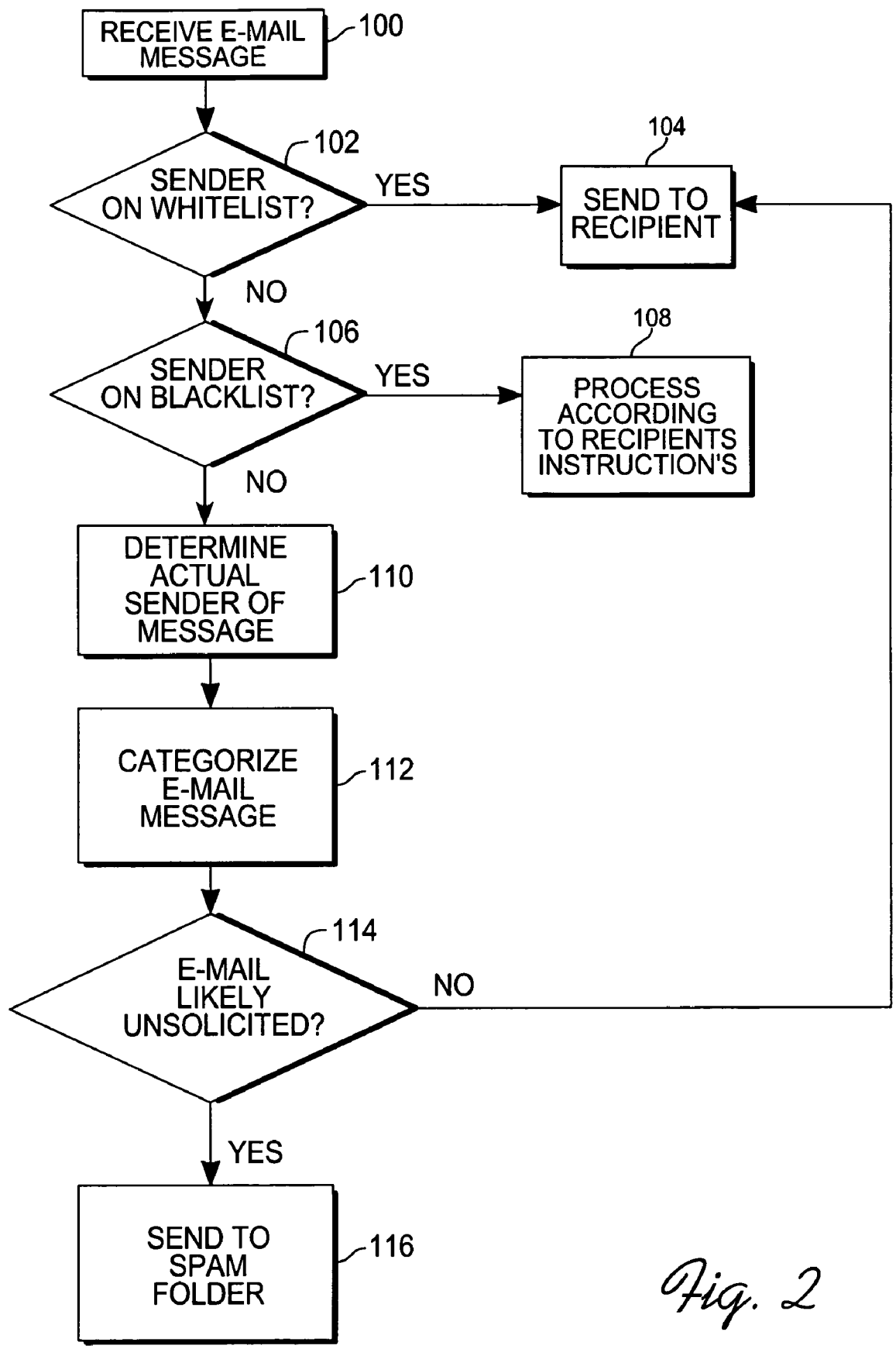
FIG. 2 is a flowchart showing how e-mail is processed in accordance with the invention.

In FIG. 2, the recipient receives an e-mail message (block 100). A whitelist, created by the recipient to indicate messages which will be accepted, is checked to see if the sender is listed (block 102). Although the whitelist may contain just e-mail addresses, the e-mail address may be combined with at least one other piece of information from the message header. This information includes fields such as the display name, the final IP address, x-mailer, final domain name, user-agent, information about the client software used by the sender, time zone, source IP address, and the sendmail version used by a first receiver. Single pieces of information that are difficult to forge, such as the display name, final IP, domain name, or IP address may be used instead of an e-mail address to list and check senders in other embodiments; in these embodiments, if an incoming message has the information that the user has included on a whitelist, for instance, a final domain name, that message would pass the whitelist test.

In another embodiment, a whitelist may be created by specialized software (which may be associated with filtering software) running at the recipient's computer. A whitelist may be constructed from the "Contacts" or "Address Book" section (i.e., any area where the recipient stores a list of e-mail addresses the recipient uses to contact others) of the recipient's e-mail program as well as using the To:, Cc:, and Bcc: information of e-mails that the recipient has sent (this may be done, for instance, by scanning the recipient's "Sent Items" folder in the e-mail program). In other words, the whitelist is constructed based on information about other e-mail users to whom the recipient has sent at least one e-mail or who have been explicitly added to the recipient's "Contacts"/"Address Book." Subject lines may also be used to determine if a sender should be included on the whitelist. The subject line of a received message, stripped of any prefix such as re: and fwd:, is checked to see if it matches the subject line of a message recently sent by the user. (The user or administrator may set a parameter to determine the time frame for which the subject line is checked, for instance, messages sent over the last 3 days, 30 days, etc. The user or administrator may also set a character or phrase limitation for adding senders to the whitelist. For instance, the phrase "hi" may be used by both the user's acquaintances as well as spammers; the user or system and administrator may determine that messages from senders containing the subject line "hi" should not automatically be added to the whitelist.) As noted above, the whitelist may contain just e-mail addresses or the e-mail address may be combined with at least one other piece of information from the message header. This information includes fields such as the display name, the final IP address, x-mailer, final domain name, user-agent, information about the client software used by the sender, time zone, source IP address, and the sendmail version used by a first receiver. Single pieces of information that are difficult to forge, such as the display name, final IP, domain name, or IP address may be used instead of an e-mail address. In other embodiments, folders of saved messages may also be checked to construct the whitelist, though care should be taken that folders containing junk mail are eliminated from the construction process. This approach to constructing a whitelist may be employed at initialization as well as after initialization.

Returning again to FIG. 2, if the sender is on the whitelist, the message is passed on to the recipient (block 104) (for instance, placed in the recipient's inbox). If the sender is not on the whitelist (block 102), a blacklist, created by the recipient to indicate messages which will not be accepted, is checked (block 106). Senders on the blacklist may be listed by e-mail address, e-mail address plus at least one piece of information from the message header, or other single pieces of information like the display name, final IP, domain name, IP path, etc. If the sender is on the blacklist (block 106), the message is processed according to the recipient's instructions (block 108). For instance, the message could be deleted or sent to a spam folder (i.e., any folder designated as holding suspected unsolicited e-mail). In this embodiment, the spam folder is located at the recipient although it could be located at the incoming mail server in other embodiments.

In this embodiment, if the sender is not on the blacklist (block 106), the actual sender of the message is determined (block 110). (In other embodiments, other information identifying the sender, such as final IP address, final domain name, IP path, etc. may be used.) The sender may be determined by an e-mail address or IP address. However, since these may easily be forged, it may be preferable to create a more trustworthy identifier indicating an actual sender by combining pieces of information in the message header (discussed below), at least one of which is not easily forged. A range of IP addresses (where the top numbers of the IP address are identical but the last N bits are variable, indicating machines belonging to the same service provider or organization (for instance, the top 3 numbers may be the same but the last byte is variable)) may also be combined with at least one piece of information from the message header to create the signature. For instance, since some Internet Service Providers ("ISPs") allow users to send with any "From" address, using two pieces of information (for instance, a source IP (the computer used to send the message) and a final domain name (the domain name corresponding to the IP address of the server which handed the e-mail message off to the recipient's trusted infrastructure) or final IP address (the IP address of the server which handed the e-mail message off to the recipient's trusted infrastructure (for instance, the recipient's mail server or a server associated with a recipient's forwarder or e-mail alias)), to identify an actual sender may be preferable since an unauthorized user probably would not know the source IP address and probably could not dial into the ISP and be assigned a machine with the same source IP address.

As shown in FIGS. 3*a* and 3*b,* message headers 50, 56 are known in the prior art. Message headers 50, 56 detail how an e-mail message arrived at the recipient's mailbox by listing the various relays 52, 84, 90, 86, 58 used to send the e-mail message to its destination. The sender 68, 72, recipient 70, 74, and date 80, 82 (when the message was written as determined by the sender's computer, including the sender's timezone 160, 162) are also listed. A unique Message-ID 76, 78 is created for each message. Other information in the message header includes the source IP address of the sender 166, 168 and information about the client software used by the actual sender 164, 126 (this may include fields such as Mail-System-Version:, Mailer:, Originating-Client:, X-Mailer:, X-MimeOLE:, and User-Agent:). The IP path indicates the IP addresses of devices which handled the message as it was sent from the sender to the recipient. For instance, in FIG. 3*a* the IP path is 456.12.3.123, 111.22.3.444.

As noted above, the actual sender may be identified by the sender's e-mail address or by creating a signature based on two or more pieces of information from the message header. This information includes: the display name of the sender; the sender's e-mail address; the sender's domain name; the final IP address; the final domain name; the name of client software used by the actual sender; the user-agent; the timezone of the sender; the source IP address; the sendmail version used by a first receiver; the IP path used to route the message; and so on. As noted above, the signature identifying the actual sender may also be created by combining a range of IP addresses with at least one piece of information from the message header.

Figure 4:
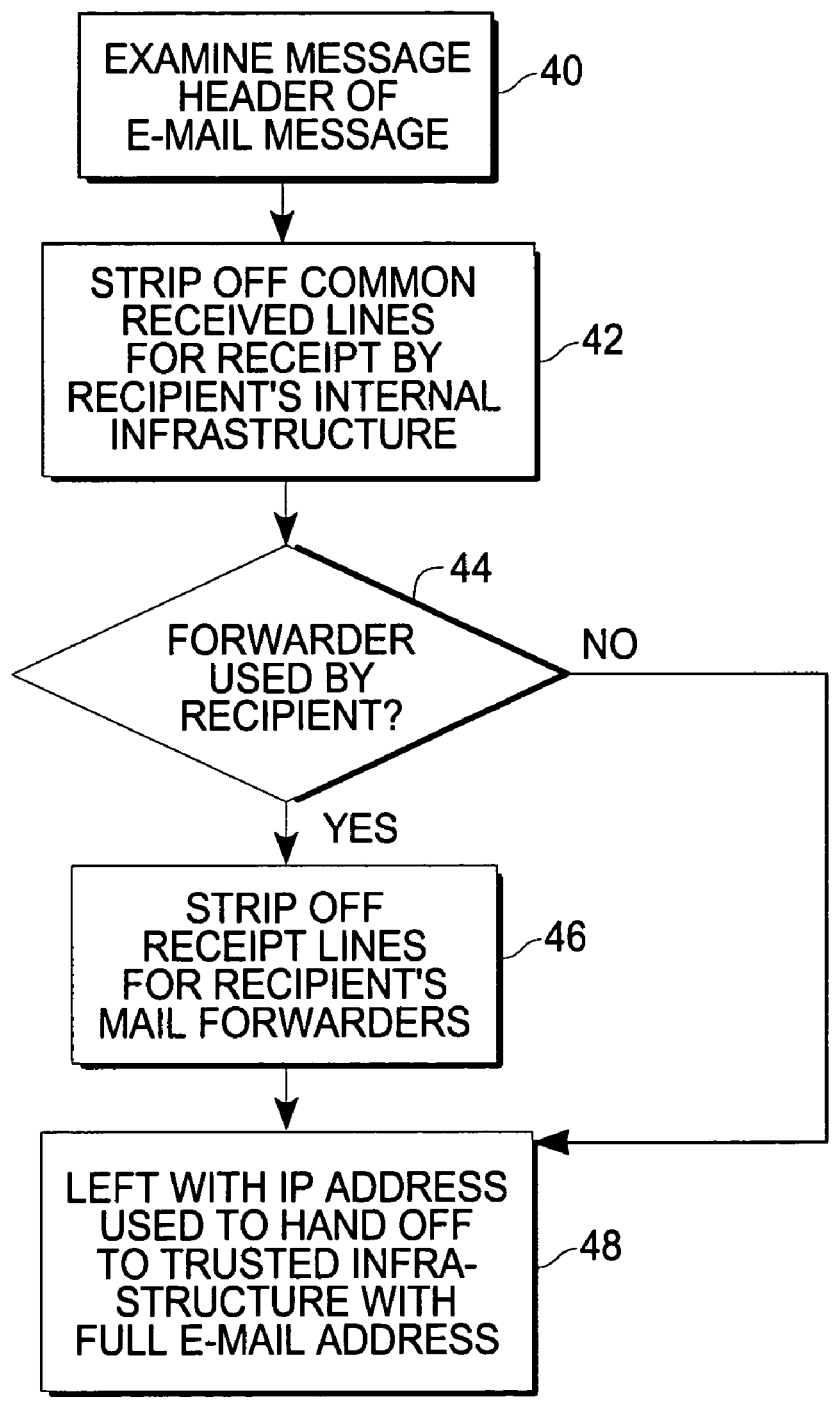
FIG. 4 is a flowchart showing how the final IP address is determined in accordance with the invention.

Referring to FIG. 4, the final IP address may be determined by examining the message header of an e-mail message (block 40). Starting at the top of the message header, the common "received" lines indicating receipt by the recipient's internal infrastructure are stripped off (block 42). If no forwarder is used by the recipient (block 44), the topmost remaining IP address corresponds to the server which handed off the message to the recipient's trusted infrastructure (block 48). If one or more forwarders are used (block 44), the receipt lines for the recipient's mail forwarder(s) (i.e., the receipt lines indicating receipt after the message was received at the domain specified in the "To" section of the header) are stripped off (block 46). The topmost remaining IP address is the final IP address (block 48).

Simplified schematics for identifying the final IP address from the message header are as follows. Where no forwarder is used, the message header identifies devices local to the recipient, i.e., the recipient's e-mail infrastructure, and devices that are remote to the recipient, presumably the sender's e-mail infrastructure. Therefore, if the message header identifies the various devices as follows:

local
local
local
remote ← this is the final IP address
remote
remote
remote the final IP address is the last remote server identified before the message is received by a local server. If a forwarding service is used, the message header might appear as follows:

local
local
local
forwarder
forwarder
remote ← this is the final IP address
remote
remote The final IP address in this situation is the last remote server identified before the message is received by the forwarding server.

In FIG. 3a, no forwarder is used. The final IP address 54 indicates the server, mail.domainone.com, that handed off to the recipient's server, domaintwo.com. With respect to FIG. 3b, a forwarder is used. Here, the receipt line 58 associated with the forwarder has to be stripped away to indicate the final IP address 62.

A final domain name is determined by performing a reverse DNS lookup of the final IP address and optionally stripping one or more names of subdomains from the result of the lookup. For instance, referring to FIG. 3b, a reverse DNS lookup of the final IP address 111.22.3.444 would identify the domain mail.domainone.com 128. The possible final domain names could be mail.domainone.com or, stripping away the subdomain, domainone.com. In this embodiment, the subdomain is stripped to leave the base domain name, domainone.com.

In other embodiments, any number, or none, of the subdomains found in the reverse DNS lookup of the final IP address may be stripped away. For instance, if the Received line indicating the final IP address reads "Received: from ispmail.com (f63.machine10.ispmail.com [64.4.15.63])", the possible final domains are: f63.machine10.ispmail.com; machine10.ispmail.com; or ispmail.com. The final domain is determined by how many, if any, subdomains are to be stripped away according to the settings determined by the system administrator or the user. In other embodiments, the final domain name may also be identified by a numerical representation, for instance, a hash code, of the final domain code. Referring to FIG. 5a, one way to identify the actual sender is to combine the display name with the final IP address. In FIG. 5b, another way to identify the actual sender is to combine the display name, the e-mail address, and the final domain name. As noted above, in other embodiments, the signature to be combined with the e-mail address can contain one or more pieces of information from the message header. In the embodiment shown in FIG. 5b, the actual sender is defined by combining the display name, the e-mail address, and the final domain name— sender@domainone.com/Joe Sender/111.22.3.444. Other ways to identify the actual sender include combining a domain name (such as the domain name of the sender from the From: line in the e-mail headers) with the final IP address. In an embodiment where the signature combines a range of IP addresses with at least one piece of information from the message header, a possible identification of the actual sender could combine the range of IP addresses with the domain name. In other embodiments, the final IP address, final domain name, or IP path may be used instead of identifying the actual sender.

Referring to FIG. 2, once the actual sender is determined (block 110), the e-mail message is categorized based on information about the actual sender (block 112). The information about the sender—the actual sender, final IP address, final domain name, IP path, etc.—as well as the recipient's "initial opinion" of the message (e.g., in whitelist, in blacklist, or not previously known) is collected at a central database in the network. (As noted earlier, in other embodiments several databases may be present at the system but they are maintained at a central server which receives information from users and then sends it to the relevant databases.) All members of the network send the central database information about messages received by the user. The information about senders is compiled at the central database along with other statistics based on the collected information to determine a sender's "reputation." (In some embodiments, a local copy of information about senders and statistics is stored and compiled at a recipient's database as well.) A good reputation indicates the sender mostly sends wanted messages, i.e., messages to recipients that have whitelisted the sender or some other information about the sender (final IP, domain name, etc.) while a bad reputation indicates the sender sends unwanted messages, i.e., messages to recipients who, prior to receiving the message, do not know the sender or who previously have explicitly blacklisted the sender. A score indicating the likelihood that a message from a particular sender is unsolicited may be determined, for example, by calculating the number of messages sent by the sender which have been whitelisted and comparing that number to the number of messages sent by the sender which have been blacklisted or are unknown (no. whitelist/(no. blacklist+no. unknown)).

In one embodiment, the score may be calculated and applied to a message by either database software or the filtering software. In another embodiment, thresholds set by either the user or system administrator determine which messages are passed through the filter and which messages are not passed by the e-mail filter and are instead sent to the spam folder or deleted. The thresholds may be based either on raw statistics or on scores. The threshold should be set so that messages from senders with good reputations should be allowed through the filter while messages from senders with bad or unknown reputations are not allowed through the filter (mechanisms for dealing with senders with unknown reputations are discussed below). For instance, if more than one percent of an actual sender's total number of messages sent or total number messages sent to unique users, go to recipients who wish to receive the message, it is likely that the actual sender is not sending spam since a one percent response rate to a spam message would be high. Therefore, a threshold may be set where an actual sender has a good reputation if greater than one percent of his or her messages are wanted by the recipients. Messages from actual senders whose reputations exceed the one percent threshold may be passed to the recipient. Other values for thresholds may be used in other embodiments.

In yet another embodiment, a list of senders with good reputations is compiled at the database. Senders may be added to or removed from the database if their reputation changes. As discussed above, a threshold based on the statistics compiled at the database determines a "good" reputation and is set by either the user or system administrator. Recipients of messages from unknown senders can check the list at the database to see whether the sender has a good reputation, in which case the message will be passed through the filter. If the sender does not have a good reputation and instead possesses a bad or unknown reputation, the message is sent to the spam folder.

Figure 6:
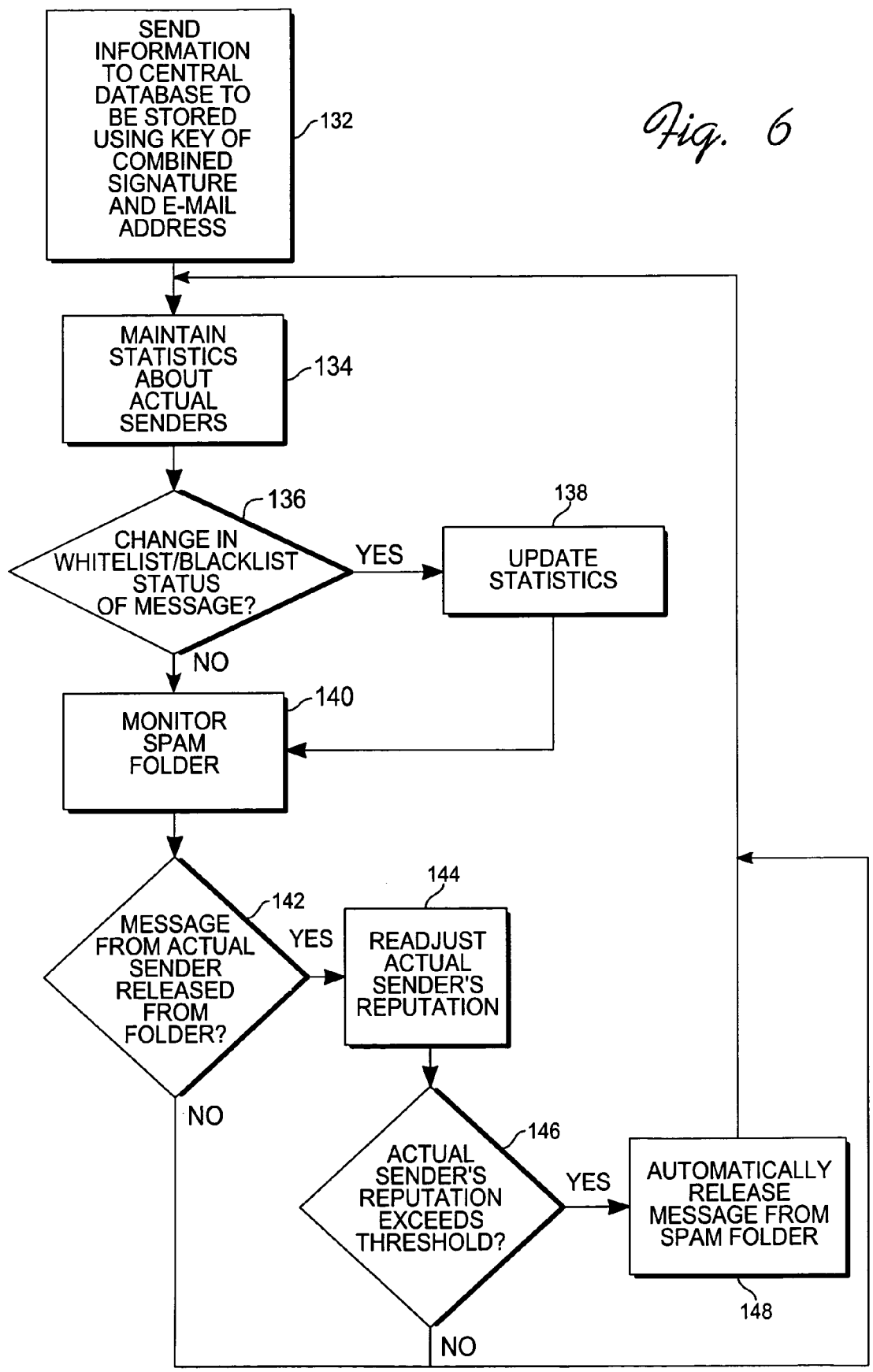
FIG. 6 is a flowchart showing how e-mail is processed in accordance with the invention.

In FIG. 6, after the message has been categorized (FIG. 2, block 112), information about the sender and the disposition of the message is sent to the central database to be stored using a key of the combined signature and e-mail address (or, in other embodiments, the e-mail address only) (block 132). (In other embodiments where information about the final IP address, final domain name, and IP path, but not the actual sender, is sent and stored, the key is the final IP address, final domain name, or IP path.) Information sent to the central database includes: information about the actual sender; whether the actual sender is included on the recipient's whitelist; whether the actual sender is included on the recipient's blacklist; whether the message could be categorized locally; and whether the recipient changed the whitelist/blacklist status of the message (i.e., changed the status of the sender of the message). (In the embodiments where information is collected and stored about the final IP address, final domain name, or IP path, the same information is sent to the central database about the final IP address, final domain name, or IP path. In other embodiments, information about the actual sender, final IP address, final domain name, and final IP path, or any combination thereof, may be sent to the central database. In all embodiments, at least two pieces of information about each received message are sent to the central database.) In one embodiment, this information is sent as soon as the message is categorized; however, the information may be sent at different time intervals (for instance, when user activity is observed) set by either the user or the system administrator in different embodiments. In one embodiment, the same information sent to the central database is also stored at the recipient device. In addition, counts, such as the number of messages from each sender, final IP address, final domain name, etc., are sent to the central database while a local copy is kept at a database at the recipient device. This gives the recipient access to a set of personal statistics and information based about messages received by the recipient as well as global statistics and information stored at the central database which is based on information about messages received by users in the network.

Figure 7:
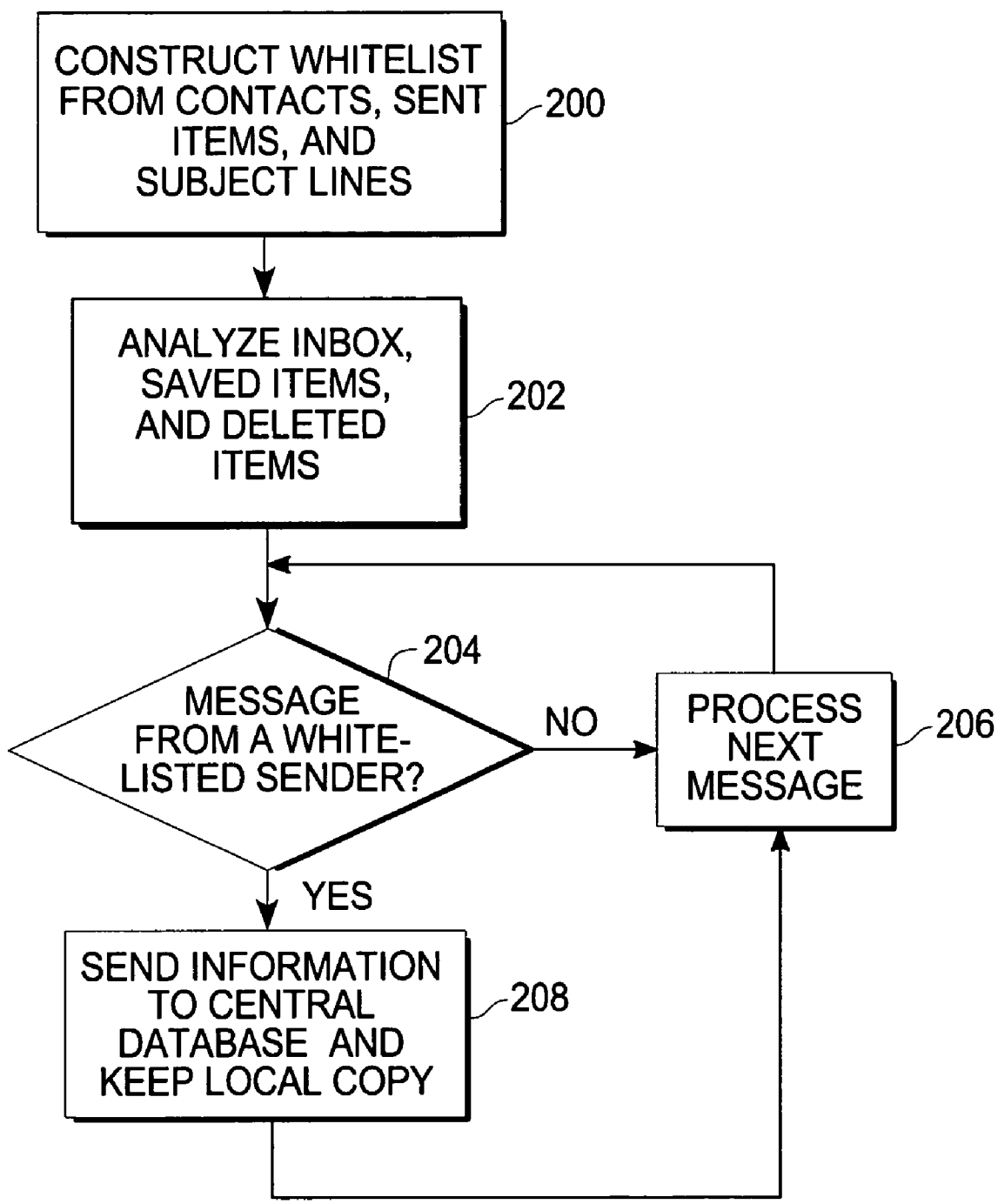
FIG. 7 is a flowchart showing how a whitelist is created in accordance with the invention.

In embodiments employing the approach to whitelist construction discussed above, where software creates a whitelist based on information from a contacts list as well as e-mails sent by the recipient to other e-mail users, information about senders is sent to the central database (and kept locally) after the whitelist is created. In FIG. 7, the whitelist is constructed as discussed above (block 200). The messages in the e-mail program's "Inbox," "Saved Items," and "Deleted Items" (or "Trash"—anyplace in the e-mail program where discarded messages are stored) are analyzed (block 202) to see if any are messages from a sender on the whitelist (block 204). If the message is not from a whitelisted sender (block 204), the next message is analyzed (block 206) to see if it was sent by a whitelisted sender (block 204). If the message was sent by a sender on the whitelist (block 204), information about the sender, such as the e-mail address, signature, actual sender, final domain name, final IP address, IP path, or any combination of these items, are sent to the central database; in addition, a local copy of the information is kept at the recipient device (block 208). In addition, counts, such as the number of messages from each sender, final IP address, final domain name, etc., are sent to the central database while a local copy may be kept at the recipient device. The next message is then processed accordingly (block 206). This process may occur at or subsequent to initialization.

Referring again to FIG. 6, the central database maintains the statistics about actual senders (or other information sent about the sender in other embodiments) (block 134). (In embodiments where a database is also present at the recipient device, the recipient's database has the same functionality for storing information and compiling statistics as the central database, discussed below. Similarly, embodiments employing multiple databases for storing and compiling information and statistics about messages sent to users in the network have the same functionality for storing and compiling statistics as the central database, discussed below.) The central database collects information from users that is used to establish raw counts, for instance: the number of messages sent by an actual sender (identified by a signature combining information from the message header); the number of messages sent by an actual sender over a time interval set by a user or system administrator; the total number of messages an actual sender sent to recipients who know the actual sender (where the sender has been included on the recipient's whitelist through any of the mechanisms discussed herein based on information in the message header: e-mail address, (final) IP address, domain name, subject line, etc.); the number of messages an actual sender sent to recipients who know the actual sender in the network over a time interval set by the user or system administrator; the number of recipients who know the actual sender; the total number of times a recipient changed an actual sender's whitelist/blacklist status; the number of times a recipient changes an actual sender's whitelist/blacklist status over a time interval set by a user or system administrator; the total number of messages sent to recipients in the network who don't know the actual sender (i.e., the sender is not on the whitelist); the number of messages sent to recipients in the network who don't know the actual sender over a time interval set by the user or system administrator; and the total number of unique recipients in the network who have received at least one message from the actual sender. The same information may also be compiled for messages' final IP addresses, final domain names, and/or IP paths. In one embodiment, information on the final IP address and all possible final domain names is collected (as noted above, if the reverse DNS lookup of the final IP address results in the domain name f63.machine10.ispmail.com, the possible final domains are f63.machine10.ispmail.com; machine10.ispmail.com; or ispmail.com. Therefore, in this embodiment, information on all these potential final domain names is collected.).

In other embodiments, separate databases may be maintained for storing different information. For instance, there may be one database to track information on senders identified by a combination of e-mail address and signature and another database for collecting information for a sender identified by a combination of the sender's e-mail address, final domain name, and final IP address. The types of information stored and the number of databases used to store that information are set by the system administrator. While the separate databases may be stored on separate machines, they are maintained by one central server which receives information from the users and sends it to the relevant databases.

In addition, the central database can use the collected information to compute statistics that may be used to indicate the likelihood that a message from a particular sender is spam. In general, these statistics show whether most of the e-mail sent by an actual sender is sent to recipients who wish to see the contents of those messages. The following statistics may be accumulated for each actual sender:

1. the ratio over a time interval (in one embodiment, 24 hours, though another time interval may be set by the user or system administrator in other embodiments) of the number of e-mails sent to recipients who know the sender (i.e., the actual sender, final IP, final domain name, or IP path was on the recipient's whitelist) in the e-mail network divided by the total number of e-mail messages sent to users in the e-mail network during the time interval;
2. the ratio over a time interval (in one embodiment, 24 hours, though another time interval may be set by the user or system administrator in other embodiments) of the number of unique recipients in the e-mail network who know the sender divided by the total number of unique recipients in the network who received e-mails from the actual sender during the time interval;
3. the ratio over a time interval (in one embodiment, 24 hours, though another time interval may be set by the user or system administrator in other embodiments) of the number of times a message from the actual sender was moved from a recipient's whitelist to the blacklist divided by the total number of times a message from the actual sender was moved either from a whitelist to a blacklist or from a blacklist to a whitelist;
4. the ratio over a time interval (in one embodiment, 24 hours, though another time interval may be set by the user or system administrator in other embodiments) of the number of unique users in the e-mail network who whitelisted the actual sender relative to the number of unique users who blacklisted the actual sender;

Similar ratios showing the actual sender mostly sends messages to recipients who know the actual sender may also be used. These ratios will return high values if the actual sender sends to recipients who know the actual sender and low values if the actual sender sends messages to recipients who do not know the actual sender and are not willing to whitelist the message. In other embodiments, these ratios may be calculated for final IP address, final domain names, and/or IP paths as required. Other metrics that are not ratios, for instance, differences, may also be calculated. For example, the difference between the number of expected messages (i.e., messages on the whitelist) versus the number of unexpected messages (i.e., messages not on the whitelist) or the number of times a user moves a message to the whitelist compared to the number of times a user moves a message to the blacklist may be useful in determining whether a message is wanted.

The ratios or differences may also be converted to a score and applied to the message (for instance, in the spam folder) to let the recipient know whether the message is likely spam. The score may also be used to sort messages, for instance if they are placed in a spam folder. The score may be a number between 0 and 100. To convert ratios to scores, the equation $[[\max(\log 10(\text{ratio}),-4)+4/6]*100$ yields a number between 0 and 100. Differences may be converted to a score by determining a percentage. The message score may also be obtained by determining the average, product, or some other function of two or more scores for the message, for instance, the score based on the reputation of the sender as identified by the sender's e-mail address and signature and the score based on the combination of the sender's e-mail address/final domain name/final IP address. This option, as well as the two or more scores (based on actual sender, final IP address, final domain name, IP path, or any combination thereof) that are used, may be set by either the individual user or the system administrator.

A low threshold may be set to differentiate "good" messages from spam. For instance, if more than one percent of an actual sender's total number of messages sent or total number messages sent to unique users, go to recipients who wish to receive the message, it is likely that the actual sender is not sending spam since a one percent response rate to a spam message would be high. Therefore, if messages from an actual sender (or, in other embodiments, a final IP address, final domain name, or IP path) exceed the one percent threshold (in other embodiments, the threshold may be set to another, higher percentage by either a user or system administrator), the messages are probably not spam and may be passed to the recipient.

Each member of the network has the option to set personal "delete" and "spam" thresholds. Assuming that a message with a low rating or score indicates a greater likelihood the message is unsolicited, if a message's rating or score drops below the spam threshold, the message is placed in the spam folder; if the message's score drop below the delete threshold, the message is deleted. These thresholds give each network member greater control over the disposition of member's e-mail messages.

Different embodiments of the invention may use different approaches to determining a sender's/message's reputation or rating. For instance, in one embodiment the initial rating may be (0,25) where the first number represents the "good" element and the second number represents the "bad" element (the ratings may also be in ratio form, such as 0:25). Implicit good or bad ratings, i.e., those based on a whitelist or blacklist, count as one point while explicit good or bad ratings, where a user manually moves a message to the whitelist or blacklist, count as 25 points. When the reputation/rating is reevaluated, the last entry is reversed and the new entry is entered. For instance, if the last entry is (0,25), indicating a user manually blacklisted a message, and the new entry reflects that one other user has whitelisted the message, the new reputation is (25,25). Other embodiments may use any rating system, with different weights given to implicit or explicit ratings, chosen by the user or system administrator.

In another embodiment, multiple values for each sender are maintained at the central database(s) in order to determine the sender's reputation. These values include: the number of messages which were explicitly ranked "good;" the number of messages which were implicitly ranked "good;" the number of messages whose ranking is unknown; the number of messages which were explicitly ranked "bad;" and the number of messages which were implicitly ranked "bad." Any number of these values may be stored; in one embodiment, as many as five of these values may be maintained for an actual sender, final IP address, final domain name, and/or IP path, depending on the embodiment. The values may represent either message counts or ratings of unique users within the network, depending on the embodiment. This approach allows the weighting algorithm of explicit vs. implicit, discussed above, to be changed at any time. For example, a value of four for the number of unknown messages (in an embodiment where the ratings of unique users was being tracked) would indicate that four unique users in the network received a message from the sender and none of the unique users has viewed the message. Once a user has viewed the message, it will be given a good or bad explicit or implicit score and the remaining unviewed messages may be processed accordingly. The central database may return up to five of these values to the recipient in order to give the recipient the ability to apply different weights to the message.

In another embodiment, new, unknown senders may be rated or scored based on information about the final IP address used by that sender. In these instances, the rating or score for the final IP address should be multiplied by some number less than one, for instance 0.51, to get a score for the new sender. This same approach may also be used to determine a rating or score for an unknown sender with a known final domain name. This approach allows senders from trusted domains (those domains whose senders send an overwhelming number of good messages, for instance, 99% of messages sent from the domain are rated as "good") to pass through the filter even if the sender is not known.

In other embodiments, new, unknown senders using known final IP addresses or final domain names may be rated based on the rating record of other new senders (i.e., recently-encountered e-mail addresses) that have recently used the final IP address or final domain name. For instance, if the majority of new senders using the final IP address or final domain name are whitelisted by other recipients in the network, other new senders from that final domain name or final IP address are also trusted on their initial e-mail. If a mix of new senders are whitelisted, the message from the new sender is placed in a spam folder (or, in one embodiment, as "suspected" spam folder where messages which are not easily categorized, for instance because of lack of information, are placed for the recipient to view and rate).

Senders using different IP addresses may get passed through the filter provided they send to known recipients. For instance, if a sender dials into his or her ISP, gets a unique IP number, and sends a message to someone in the e-mail network he or she just met, the sender's reputation for messages from that IP address (assuming that the actual sender here is identified by the e-mail address and source IP address) will be based on 0 messages sent to known recipients and 1 message sent to a recipient in the network—a ratio of 0:1. (In this example, the ratio being used is based on the number of messages sent to known recipients compared to the number of messages sent to unknown recipients. Other ratios may be used in other embodiments.) Therefore, this e-mail message is placed in a spam folder. However, if the sender sends a message to a known recipient, the ratio of messages sent to known recipients compared to messages sent to unknown recipients has improved to 1:1. Since most users' thresholds are set to one percent, or a ratio of 1:100, the first message can be released from the spam folder since the threshold for this sender has been exceeded.

In another example, the same sender dials into an ISP, gets a unique IP number, and sends messages to two unknown recipients. The sender's reputation is based on 0 messages sent to known recipients and 2 messages sent to unique recipients in the network—a ratio of 0:2. However, if one of the recipients reviews the spam folder and removes the message from the sender from the spam folder, the ratio improves to 1 message sent to a known recipient compared to 2 messages sent—the ratio has improved to 1:2. This ratio exceeds the one percent threshold and the message that remains in the spam folder may also be released. When messages are released from the spam folder, the message is added to the whitelist. Therefore, assuming that the user does not subsequently remove the message from the whitelist, future messages from the same sender to the same recipient will be passed to the recipient because the sender is on the whitelist. Provided messages from this sender still exceed the threshold, messages sent from the sender should be passed directly to the recipient (provided the recipient has not placed the sender on a blacklist) and will not be placed in the recipient's spam folder.

New final IP addresses may be given an initial "good score" in one embodiment since final IP addresses are difficult to manufacture. A new final IP address (or, in other embodiments, a new final domain name) may be given an implicit "good" count of one or more—for instance, its initial rating could be (1,0) (as noted above, the first number represents the "good" element while the second number indicates the "bad" element). A sender with a new final IP address will have his or her first message passed through the filter. Provided subsequent e-mails are not blacklisted, those e-mail messages will also be passed through and increase the reputation of the sender and the final IP address. However, is the sender is sending unsolicited e-mails, his or reputation will quickly drop and the sender's messages will be stopped by the filter. This approach enables legitimate new sites, as indicated by the final IP address (or final domain name) to establish and maintain a positive reputation within the e-mail network.

This approach may also be employed in embodiments where a message score is obtained by determining the average, product, or some other function of two scores for the message. For instance, in an embodiment where the sender's score and the final IP address score are determined by dividing the number of good messages received by the total number of messages (good+bad) received and multiplying by 100, the message score is determined by the product of the sender's score and the final IP address's score, and the first message from a new sender and a new final IP address are each given an implicit good rating (i.e., a rating of 1), the message score for a new message sent by a new sender from a new final IP address is $(1/(1+0)*1/(1+0))*100$, or 100. However, if the sender sends 4 unsolicited messages to other users in the network, the next message from the sender will receive a score of $(1/(1+4)*1/(1+4))*100$, or 4. This new message score, which reflects the fact that the new sender at the new IP address has sent more unsolicited e-mail than wanted messages, is sufficient to place the newest message in the spam folder. In cases where a new sender uses a final IP address which is known to be associated with spammers, messages from new senders will not be placed in the recipient's inbox because the message score is (1/(1+0)*1/(1+large number of unsolicited messages sent from a suspect final IP address))*100, which will give a number close to 0. In some embodiments, "bad" domain reputations, as measured by final IP address or final domain name, may be reset at some interval, for instance, once a week, in case the final IP address has been reassigned.

In embodiments where the message score is determined by multiplying the sender's reputation with some other factor (final IP address reputation, final domain name reputation, etc.), a message from a new sender may be scored by relying exclusively on the other factor. For instance, in embodiments where the message score is determined by multiplying the sender's reputation and the final IP address reputation, a message from a new sender who is using an established final IP address may be scored by relying only on the final IP address.

In other embodiments, different initial ratings for new senders, etc., may be used. The longer the e-mail network is in place, the less likely it will be to encounter new final IP addresses. A new final IP address may be given a rating of (1,1) when the network is fairly new and, after a few months, new final IP addresses may be given a rating of (1,2). In instances where only the final IP address rating is used to score a message, and the initial rating is (1,1), the message from the new final IP address will be placed at the top of the spam folder, where the recipient may decide whether to whitelist or blacklist it. In another embodiment, the software could send a challenge or notification e-mail to the sender using the new final IP address indicating that the message was placed in a spam folder and the sender should contact the recipient in some other fashion. This approach may also be used for new final domain names. A "most respected rater" scheme may be used in another embodiment. Each new member of the network is given a number when joining. Members with lower numbers (indicating longer membership in the network) have more "clout" and can overwrite members with higher numbers. (Member numbers are recognized when the member logs in to the network and the system can associate each member with his or her number when information is sent to the central database.) Ratings may be monitored and if a new member's ratings are inconsistent with other members' ratings, the new members' ratings are overwritten. This rating scheme is difficult for hackers to compromise. Another rating approach requires the release of small numbers of a sender's messages into the inboxes of recipients. The released messages are monitored and the frequency with which these messages are blacklisted is determined. If a small percentage of the released messages is added to blacklists, a larger random sample of a sender's messages is released and the frequency with which these messages are blacklisted is determined. This process is repeated until all the sender's messages are released or the frequency with which the messages in the sample are blacklisted indicates the sender's message is unwanted.

One rating approach requires other members of the network to "outvote" a rating decision made by another member in order to change the rating. For instance, if one member decides to place a message in the Inbox, two other members will have to "vote" to place it in the spam folder in order for the message to be placed in the spam folder. If four members vote to release a message from the spam folder, eight members would have to vote to put it back in the spam folder in order for the message to be returned to the spam folder. The rating eventually stabilizes since there are more good members rating the messages than bad members. Even if a decision made by a member about categorizing a message is outvoted, this does not affect the member's own inbox or spam folder, etc., nor does it affect the rating of the message at the member's personal database.

Referring to FIG. 2, in order to categorize the e-mail (block 112), the recipient may have to request information from the central database. The statistics and scores about actual senders, final IP addresses, final domain names, or IP paths are sent from the central database to the recipient, either upon request, after which they are stored locally at the recipient device in a table or database dedicated to "global" statistics (as opposed to personal statistics based exclusively on messages sent to the recipient), or at regular intervals (for instance, updated statistics about actual senders, final IP addresses, final domain names, and/or IP paths known to the recipient may be sent every day, though in other embodiments different intervals may be set by either the user or the system administrator). The ratios or scores are used to determine whether a message is likely good or spam. In this embodiment, information about the actual sender is used to categorize the e-mail. If the reputation of the actual sender (as measured by the ratios and statistics) passes the threshold, i.e., the sender has a good reputation, the message may be processed accordingly (for instance, the message may be placed in the recipient's inbox). In another embodiment, a list of actual senders (identified by a the senders' signatures) with good reputations is checked at the database and the message is processed accordingly and a message from an actual sender with a good reputation is placed in the recipient's inbox.

Figure 8:
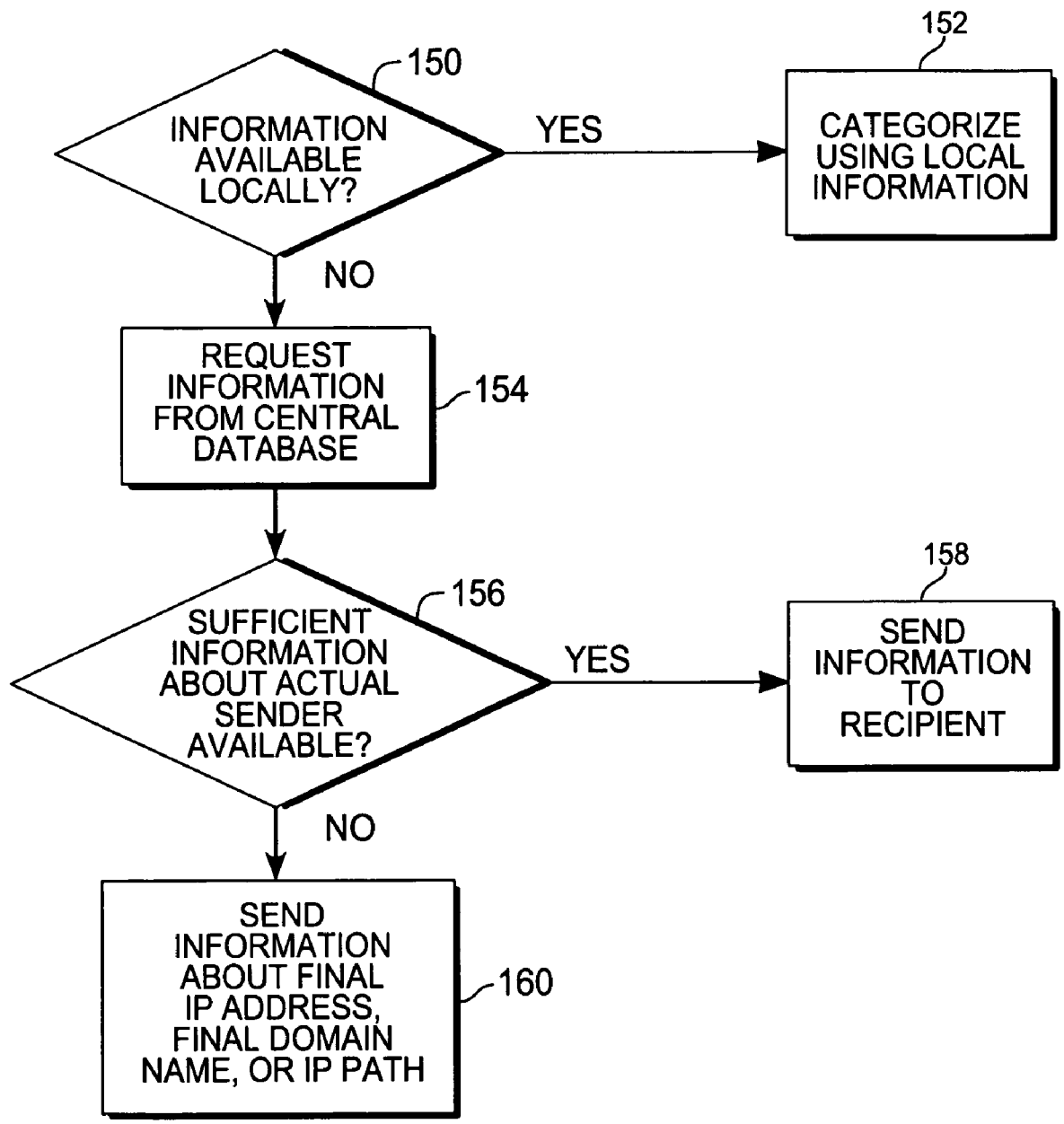
FIG. 8 is a flowchart showing how e-mail is categorized in accordance with the invention.

In FIG. 8, if information about the actual sender is available locally (i.e., there is information about the actual sender at the recipient's database) (block 150), the message may be categorized locally (block 152). (In embodiments where personal statistics are stored at the recipient device, these statistics are checked first before checking the global statistics stored at the recipient device.) However, if information about the actual sender is not available locally (block 150), information may be requested from the central database (block 154). (In embodiments where several databases are utilized, requests are sent to the central database which then retrieves the information from the relevant databases and sends it to the recipient device.) If there is sufficient information available for the actual sender (i.e., the actual sender has been active in the network long enough that reliable statistics have been obtained (for instance, a week, though other time periods may be employed in other embodiments) (block 156), the central database will send the recipient information, including raw counts, ratios, and scores, about the actual sender (block 158). However, if information about the actual sender is unavailable or is unreliable (block 156), the central database will send the recipient information about the final IP address, final domain name, or IP path in the message (block 160). (In other embodiments, raw counts about the final IP address, final domain name, or IP path may be sent regardless of the information available about the actual sender; these raw counts may be used by the recipient to determine ratios, etc. In those embodiments where the characterizing information about the sender is the final IP address, final domain name, or IP path, requests for information are sent to the central database if there is insufficient information to characterize the message locally.)

In one embodiment, the central database may return two or more values or scores to the recipient instead of just one.

For instance, the central database may return values or scores based on final domain name/final IP address and e-mail address/signature. (Values and scores based on other types of information may be sent in other embodiments.) If the recipient has a value or score from the personal database, the value or score from the personal database may be used instead of the value or score from the global database.

Figure 9:
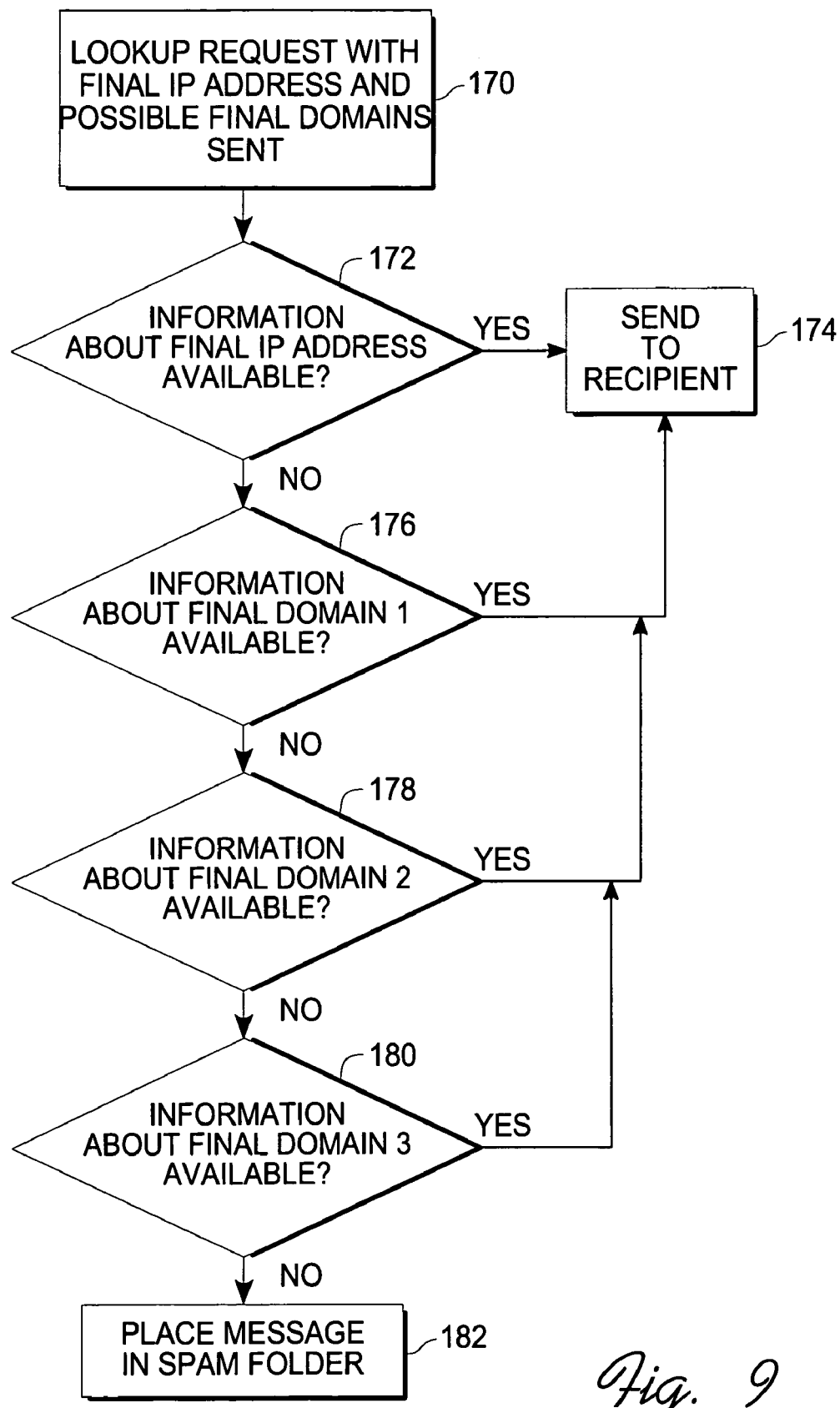
FIG. 9 is a flowchart showing how a lookup of information is handled in accordance with the invention.

In other embodiments, information about the final IP address, final domain name, and/or the IP path is used to categorize the message. The information is used to determine if senders using the final IP address, final domain name, and/or IP path have sent spam messages (provided this option is set by either the system administrator or the user). While the information may be looked up for each final IP address, final domain name, etc., on an individual basis, in another embodiment various pieces of information may be used during the lookup to determine the closest match to information in the central database. For instance, in an example above, the final IP address was found to be 64.12.136.5 and the possible final domains were f63.machine10.ispmail.com ("final domain 1"); machine10.ispmail.com ("final domain 2"); or ispmail.com ("final domain 3"). With reference to FIG. 9, in this embodiment, a lookup request containing the final IP address and the possible final domains is sent to the central database (block 170). The central database checks to see if there is information about the final IP address (block 172). If information about the final IP address is available (block 172), it is sent to the recipient (block 174). However, if information about the final IP address is not available, the central database checks to see if information about final domain 1 is available (block 176). If so, that information is sent to the recipient (block 174); if no information is available for final domain 1 (block 176), final domain 2 is checked (block 178). If information is available for final domain 2 (block 178), it is sent to the recipient (block 174); if not (block 178), the central database checks to see if information about final domain 3 is available (block 180). If information is available (block 180), it is sent to the recipient (block 174); otherwise, since no information about the final IP addresses or final domain names is available to be sent to the recipient, the message will be placed in the recipient's spam folder (block 182). On future lookups, the IP address and final domain names are checked in the same order to determine the best possible match.

In one embodiment, the message is passed only if the final IP address, final domain name, or IP path have never been used to pass unwanted messages. However, other thresholds may be set by the user or system administrator in other embodiments which would allow messages to be passed provided the information about the final IP address, final domain name, or IP path passes the threshold.

Referring again to FIG. 2, if the categorized e-mail does not seem to be spam (block 114), the message is sent to the recipient (for instance, the message is sent to the recipient's inbox) (block 104). However, if the e-mail appears to be spam (block 114), it is sent to a spam folder (block 116). As noted above, the spam folder may be located at either the recipient device or at the incoming mail server. The spam folder may be reviewed by a recipient to determine whether he or she wishes to view any of these messages. A recipient may manually release a message from the spam folder. If a message is released from the spam folder, it is placed on the whitelist unless the recipient decides otherwise. As noted above, scores from the central database or recipient's database may be applied to messages in the spam folder to indicate likelihood the messages are spam or may be used to sort the messages (for instance, messages that are almost certainly spam are placed at the bottom of the list while messages that are more likely to be of interest to the recipient are placed near the top of the list).

Since the reputations of actual senders, final IP addresses, final domain names, and IP paths can change over time, the spam folder should be re-evaluated periodically to determine whether a message should be released from the spam folder and sent to the recipient (block 118). The central database will update the raw counts and statistics for the actual sender as it receives information from each recipient in the network (the statistics for final IP addresses, final domain names, and/or IP paths are also updated when this occurs). However, if low thresholds indicating whether an actual sender (or a sender using a final IP address or final domain name) sends mostly good messages are employed, messages may automatically be removed from the spam folder if messages from the actual sender (or final IP address or final domain name) exceed the threshold. Normally, a message that can't be rated locally is put in a spam folder and rating is delayed until user activity (i.e., any interaction (sending a message, viewing a folder, etc.) with the e-mail program) is observed. This "just in time" rating ensures that messages are categorized using the most recent data before the messages are read. In another embodiment, the "just in time" rating can work as follows: when the reputation of a sender changes (good to bad, bad to good, good to suspect, etc.), the central database(s) tracking global statistics will send, or push, this information to all recipients in the network. The recipients can then check all messages received over the previous 24 hours (another time period may be specified by the user or system administrator in another embodiment) and updating the rating or categorization of that message as necessary. With reference to FIG. 6, if a message's whitelist/blacklist status (i.e., a message is moved from the whitelist to the blacklist or vice versa) (block 136) changes, the central database is notified and the statistics are updated (block 138). In one embodiment, higher weight is given to manual (explicit) reversals of whitelist/blacklist status than implicit rankings (where, for instance, a sender is automatically placed on a whitelist because of the sender's reputation rather than a user explicitly placing the sender on the whitelist). Reversals may be weighed at 100 times a regular vote (different weights may be used in other embodiments). If a sender sends 1,000 e-mails for the first time to a customer list, the ratio of good/total messages is 0/1000. However, if 10 customers (one percent of the recipients) reverse, the ratio becomes 1000/1000, which greatly exceeds the threshold of a one percent favorable response required to release the other messages from the spam folder.

Regardless of whether the statistics need to be updated, the recipients' spam folders are monitored (block 140). When a message from an actual sender is released from the spam folder (block 142), the actual sender's reputation is readjusted as discussed above (block 144). If the actual sender's reputation now exceeds the threshold (block 146), other messages from the actual sender are automatically released from spam folders (block 148). This is done by the software at the recipient's computer after receiving updates from the central database. In one embodiment, updated information is requested from the central database when the user opens the spam folder. When the information is received, it should be applied to the messages in the spam folder, allowing the user to use the most current information to make decisions about messages in the spam folder. In another embodiment, where the spam folder is located at the incoming mail server, software at the mail server requests information from the central database and manages the spam folder accordingly. If the actual sender's reputation does not exceed the threshold (block 146), or if no messages were released from the spam folder (block 142), no further action is taken other than to continue to maintain statistics about actual senders (block 134).

In other embodiments, the Inbox as well as the spam folder is also periodically reevaluated to determine if the rating of any of the senders of messages in the Inbox has changed. If the sender's reputation is no longer "good," and the sender has not been explicitly whitelisted by the recipient, the message can be removed to a spam folder and processed accordingly or deleted, depending on the rating and the recipient's settings. In some embodiments, different formulas may be used each time a message is rated. For instance, the first time a message from an unknown sender is rated, part of the criteria for rating the message may employ the number of messages recently sent by the unknown sender (if the unknown sender is a spammer, it is likely that he or she will send a high volume of messages in a short time period). A user or system administrator can set the time period (one hour, one day, etc.) which is checked. On subsequent checks, the unknown sender's rating will have been established within the network and therefore the number of messages sent recently will not be as determinative of the message's rating as it previously was. The frequency with which the Inbox and/or spam folder is reevaluated may be determined by the user or the system administrator.

What is claimed is:

1. In a network, a method of processing e-mail messages comprising:
   a) receiving an e-mail message from an unknown sender;
   b) requesting information about the sender from at least one database that compiles global statistics about senders based on information about the sender received from recipients in the network, wherein compiling statistics includes determining a ratio reflecting whether the sender sends a majority of messages to recipients who have included the sender on a whitelist, wherein the statistics are used to determine a sender's reputation, wherein the sender is identified based on data in the message header including at least one of the following:
      i) an actual sender;
      ii) a final IP address used by the sender;
      iii) a final domain name used by the sender; or
      iv) an IP path used by the sender; and
   c) categorizing whether the e-mail message is good based on information received about the sender's reputation, wherein the e-mail message is allowed through a recipient's e-mail filter it the reputation as good and the e-mail message is not allowed through the e-mail filter if the reputation is either not good or not known.

2. The method of claim 1 wherein the actual sender is identified by a signature that includes at least two of the following fields from the message header:
   a) an e-mail address used by the sender;
   b) a display name used by the sender;
   c) a domain name used by the sender;
   d) a final IP address used by the sender;
   e) a final domain name used by the sender;
   f) a user-agent;
   g) a timezone;
   h) a source IP address;
   i) a name of client software used by the sender;
   j) a sendmail version used by a first receiver; and
   k) an IP path used to route the message.

3. The method of claim 1 wherein the actual sender is identified by a signature including a range of IP addresses and at least one of the following fields from the message header:
   a) an e-mail address used by the sender;
   b) a display name used by the sender;
   c) a domain name used by the sender;
   d) the final IP address used by the sender;
   e) the final domain name used by the sender;
   f) the name of client software used by the actual sender;
   g) user-agent;
   h) timezone;
   i) source IP address;
   j) sendmail version used by a first receiver; and
   k) the IP path used to route the message.

4. The method of claim 1 wherein the at least one database includes one of the following:
   a) a central database; or
   b) at least two centrally-maintained databases, each storing and compiling different information and statistics.

5. The method of claim 1 further comprising using statistics compiled at the at least one database to compute a score indicating a likelihood that the received message is an unsolicited message.

6. The method of claim 5 wherein the score increases as a number of accepted messages having the same information about the sender as the received message increases, the information including one of the following:
   a) the actual sender;
   b) a final IP address;
   c) a final domain name; or
   d) an IP path.

7. The method of claim 5 wherein the score decreases as a number of rejected messages having the same information about the sender as the received message increases, the information including one of the following:
   a) the actual sender;
   b) a final IP address;
   c) a final domain name; or
   d) an IP path.

8. The method of claim 1 further comprising tracking at least one of the following pieces of information about messages from senders:
   a) a total number of messages sent;
   b) a total number of messages sent over a first predetermined time period;
   c) a total number of messages sent to recipients in the network who have included the sender on a whitelist;
   d) a number of messages sent to recipients in the network who have included the sender on the whitelist over a second predetermined time period;
   e) a number of recipients who have included the sender on the recipient's whitelist;
   f) a total number of times a recipient changed a sender's whitelist/blacklist status;
   g) a number of times a recipient changed a sender'.s whitelist/blacklist status over a third predetermined time period;
   h) a total number of messages sent to recipients in the network who have not included the sender on the whitelist;
   i) a number of messages sent to recipients in the network who have not included the sender on the whitelist over a fourth predetermined time period;
   j) a total number of unique recipients in the network who have received at least one message from the sender;

k) a total number of messages sent to unique recipients in the network who have included the sender on the whitelist; and l) a total number of messages sent to unique recipients in the network who have not included the sender on the whitelist, wherein the sender is identified by one of the group consisting of the actual sender, the final IP address, the final domain name, or the IP path used to send the message.

9. The method of claim 1 wherein compiling statistics about senders includes at least one of the following:

a) determining a ratio of a first number e-mail messages sent by a sender to recipients in the network who have included the sender on a whitelist in a predetermined time period divided by a second number of e-mail messages sent by the sender to users in the network in the predetermined time period;

b) determining a ratio of a first number of recipients in the network who have included the sender on the whitelist divided by a second number of unique recipients in the network who received e-mails from the sender in a predetermined time period;

c) determining a ratio of a first number of times in a predetermined time interval a message from the sender was moved from a whitelist to a blacklist divided by a second number of times a message from the sender was moved from a whitelist to a blacklist;

d) determining a ratio of a first number of times in a predetermined time interval a message from the sender was moved from a blacklist to a whitelist divided by a second number of times a message from the sender was moved from a blacklist to a whitelist;

e) determining a ratio of a first number of unique users within the network who whitelisted the sender within a predetermined time period compared to a second number of unique users within the network who blacklisted the sender within the predetermined time period;

f) determining a ratio reflecting a first number of wanted messages sent by the sender compared to a second number of unwanted or total messages sent by the sender;

g) determining a difference between a first number of expected messages sent by the sender and a second number of unexpected messages sent by the sender;

h) determining a difference between a first number of times a user whitelisted a message from the sender and a second number of times a user blacklisted a message from the sender; and i) determining a difference reflecting whether the sender sends a majority of messages to known recipients, wherein the sender is identified by one of the group consisting of the actual sender, the final IP address, the final domain name, or the IP path used to send the message.

10. The method of claim 1 further comprising placing a message which is not allowed through the e-mail filter in a span folder.

11. The method of claim 10 further comprising monitoring the span folder at predetermined intervals to determine whether messages in the folder should be released because the reputation of the sender has changed.

12. The method of claim 1 further comprising monitoring the inbox at predetermined intervals to determine whether messages should remain in the inbox.

13. The method of claim 1 further comprising maintaining at the database at least four of the following values:

a) a number of messages which were explicitly ranked good;

b) a number of messages which were implicitly ranked good;

c) a number of messages whose ranking is unknown;

d) a number of messages which were explicitly ranked bad; and e) a number of messages which were implicitly ranked bad;

wherein the values are based on messages having the same information about the sender including one of the following:

a) the signature;

b) a final IP address used by the sender;

c) a final domain name used by the sender; or d) an IP path used by the sender.

14. The method of claim 13 wherein the values represent one of the following:

a) message counts; or b) ratings of unique sets within the network.

15. The method of claim 14 further comprising at least four of the values being returned to the recipient to allow the recipient to apply different weights to a message in order to categorize the message.

16. The method of claim 1 further comprising tracking local statistics about senders identified by data in the message header at a local database.

17. The method of claim 1 further comprising assessing the reputation of the sender of a received message when user activity is observed.

18. The method of claim 1 further comprising sending recipients a notification when any sender's reputation changes.

19. The method of claim 18 further comprising reviewing all messages received in a predetermined time period preceding receipt of the notification and updating the categorization of the message as necessary.

20. In a network, a method of processing e-mail messages comprising:

a) receiving information about e-mail messages from recipients of the messages in the network, wherein the information received includes:

i) an identification of a sender of a first message, wherein the identification is based on data in the message header and includes at least one of the following:

A) an actual sender;

B) a final IP address used by the sender;

C) a final domain name used by the sender; or

D) an IP path used by the sender; and ii) an indication of whether the recipient considered the first message good or bad;

b) compiling global statistics for senders of messages wherein the statistics are used to determine a sender's reputation for sending good messages, the statistics including a total number of messages sent to unique recipients in the network who have included the sender on a whitelist; and c) creating a list of senders with good reputations that may be referenced by recipients of messages from unknown senders in the network, wherein a second message from one sender on the list is allowed through a recipient's e-mail filter and a third message from another sender not on the list is not allowed through the recipient's e-mail filter.

21. The method of claim 20 wherein the actual sender is identified by a signature having at least two of the following fields from the message header:
   a) an e-mail address used by the sender;
   b) a display name used by the sender;
   c) a domain name used by the sender;
   d) a final IP address used by the sender;
   e) a final domain name used by the sender;
   f) a user-agent;
   g) a timezone;
   h) a source IP address;
   i) a name of client software used by the sender;
   j) a sendmail version used by a first receiver; and
   k) an IP path used to route the message.

22. The method of clam 21 wherein the actual sender is identified by a signature including a range of IP addresses and at least one of the following fields from the message header:
   a) an e-mail address used by the sender;
   b) a display name used by the sender;
   c) a domain name used by the sender;
   d) the final IP address used by the sender;
   e) the final domain name used by the sender;
   f) the name of client software used by the actual sender;
   g) user-agent;
   h) timezone;
   i) source IP address;
   j) sendmail version used by a first receiver; and
   k) the IP path used to route the message.

23. The method of claim 20 wherein the at least one database includes one of the following:
   a) a central database; or
   b) at least two centrally-maintained databases, each storing and compiling different information and statistics.

24. The method of claim 20 further comprising using statistics compiled at the at least one database to determine a sender's reputation.

25. The method of claim 24 further comprising adding a sender to the list when the sender's reputation passes a predetermined threshold indicating a good reputation.

26. The method of claim 24 further comprising removing a sender from the list when the sender's reputation is below a predetermined threshold indicating a good reputation.

27. The method of claim 20 further comprising tracking at least one of the following pieces of information about messages from senders:
   a) a total number of messages sent;
   b) a total number of messages sent over a first predetermined time period;
   c) a total number of messages sent to recipients in the network who have included the sender on a whitelist;
   d) a number of messages sent to recipients in the network who have included the sender on the whitelist over a second predetermined time period;
   e) a number of recipients who have included the sender on the recipient's whitelist;
   f) a total number of times a recipient changed a sender's whitelist/blacklist status;
   g) a number of times a recipient changed a sender's whitelist/blacklist status over a third predetermined time period;
   h) a total number of messages sent to recipients in the network who have not included the sender on the whitelist;
   i) a number of messages sent to recipients in the network who have not included the sender on the whitelist over a fourth predetermined time period;
   j) a total number of unique recipients in the network who have received at least one message from the sender; and
   k) a total number of messages sent to unique recipients in the network who have not included the sender on the whitelist,
   wherein the sender is identified by one of the group consisting of the actual sender, the final IP address, the final domain name, or the IP path used to send the message.

28. The method of claim 20 wherein compiling statistics about senders includes at least one of the following:
   a) determining a ratio of a first number e-mail messages sent by a sender to recipients in the network who have included the sender on a whitelist in a predetermined Lime period divided by a second number of e-mail messages sent by the sender to users in the network in the predetermined time period;
   b) determining a ratio of a first number of recipients in the network who have included the sender on the whitelist divided by a second number of unique recipients in the network who received e-mails from the sender in a predetermined time period;
   c) determining a ratio of a first number of times in a predetermined time interval a message from the sender was moved from a whitelist to a blacklist divided by a second number of times a message from the sender was moved from a whitelist to a blacklist;
   d) determining a ratio of a first number of times in a predetermined time interval a message from the sender was moved from a blacklist to a whitelist divided by a second number of times a message from the sender was moved from a blacklist to a whitelist;
   e) determining a ratio of a first number of unique users within the network who whitelisted the sender within a predetermined time period compared to a second number of unique users within the network who blacklisted the sender within the predetermined time period;
   f) determining a ratio reflecting whether the sender sends a majority of messages to recipients who have included the sender on the whitelist;
   g) determining a ratio reflecting a first number of wanted messages sent by the sender compared to a second number of unwanted or total messages sent by the sender;
   h) determining a difference between a first number of expected messages sent by the sender and a second number of unexpected messages sent by the sender;
   i) determining a difference between a first number of times a user whitelisted a message from the sender and a second number of times a user blacklisted a message from the sender; and
   j) determining a difference reflecting whether the sender sends a majority of messages to known recipients,
   wherein the sender is identified by one of the group consisting of the actual sender, the final IP address, the final domain names or the IP path used to send the message.

29. The method of claim 20 further comprising placing a message which is not allowed through the e-mail filter in a spam folder.

30. The method of claim 29 further comprising monitoring the span folder at predetermined intervals to determine whether messages in the folder should be released because the reputation of the sender has changed.

31. The method of claim 20 further comprising monitoring the inbox at predetermined intervals to determine whether messages should remain in the inbox.

32. The method of claim 20 further comprising maintaining at the database at least four of the following values:
  a) a number of messages which were explicitly ranked good;
  b) a number of messages which were implicitly ranked good;
  c) a number of messages whose ranking is unknown;
  d) a number of messages which were explicitly ranked bad; and
  e) a number of messages which were implicitly ranked bad;
  wherein the values are based on messages having the same information about the sender including one of the following:
  a) the signature;
  b) a final IP address used by the sender;
  c) a final domain name used by the sender; or
  d) an IP path used by the sender.

33. The method of claim 32 wherein the values represent one of the following:
  a) message counts; or
  b) ratings of unique users within the network.

34. The method of claim 20 further comprising tracking local statistics about senders identified by data in the message header at a local database.

35. The method of claim 20 further comprising assessing the reputation of the sender of a received message when user activity is observed.

36. The method of claim 20 further comprising sending recipients a notification when any sender's reputation changes.

37. The method of claim 20 further comprising reviewing all messages received in a predetermined time period preceding receipt of the notification and updating the categorization of the message as necessary.

38. In a network, a system for processing e-mail messages comprising:
  at least one database in network communication with a plurality of recipients of e-mail messages, each of the recipients having a first software means for filtering received e-mail messages, the database having second software means for performing the following:
    i) receiving information about e-mail messages from the recipients of the messages, wherein the information received includes:
      A) an identification of a sender of a first message based on data in the message header including at least one of the following:
        I) an actual sender;
        II) a final IP address used by the sender;
        III) a final domain name used by the sender;
        IV) an IP path used by the sender; and
      B) an indication of whether the recipient classified the first message as good or bad;
    ii) compiling statistics for sender of messages, wherein compiling statistics includes determining a ratio reflecting whether the sender sends a majority of messages to recipients who have included the sender on a whitelist, wherein the statistics are used to determine a sender's reputation for sending good messages; and
    iii) sending statistics in response to a request for statistics from the recipient of a message from an unknown sender, wherein if the sender has a good reputation the message is allowed through the first software means and if the sender has a not good or not known reputation the message is not allowed through the first software means.

39. The system of claim 38 wherein the at least one database includes one of the following:
  a) a central database; or
  b) at least two centrally-maintained databases, each storing and compiling different information and statistics.

40. The system of claim 38 wherein the at least one database and the plurality of recipients are members of an e-mail network.

41. The system of claim 38 further comprising an incoming mail server in network connection with each of the plurality of recipients.

42. The system of claim 38 wherein the actual sender is identified by signature including at least two of the following fields from the message header:
  a) an e-mail address used by the sender;
  b) a display name used by the sender;
  c) a domain name used by the sender;
  d) a final IP address used by the sender;
  e) a final domain name used by the sender;
  f) a user-agent;
  g) a timezone;
  h) a source IP address;
  i) a name of client software used by the sender
  j) a sendmail version used by a first receiver; and
  k) an IP path used to route the message.

43. The system of claim 38 wherein the actual sender is identified by a signature including a range of IP addresses and at least one of the following fields from the message header:
  a) an e-mail address used by the sender;
  b) a display name used by the sender;
  c) a domain name used by the sender;
  d) the final IP address used by the sender;
  e) the final domain name used by the sender;
  f) the name of client software used by the actual sender;
  g) user-agent;
  h) timezone;
  i) source IP address;
  j) sendmail version used by a first receiver; and
  k) the IP path used to route the message.

44. The system of claim 38 further comprising either the first or second software means using statistics compiled at the at least one database to compute a score indicating a likelihood that the received message is an unsolicited message.

45. The system of claim 44 wherein the score increases as a number of accepted messages having the same information about the sender as the received message increases, the information including one of the following:
  a) the actual sender;
  b) a final IP address;
  c) a final domain name; or
  d) an IP path.

46. The system of claim 44 wherein the score decreases as a number of rejected messages having the same information about the sender as the received message increases, the information including one of the following:
  a) the actual sender;
  b) a final IP address;
  c) a final domain name; or
  d) an IP path.

47. The system of claim 38 further comprising the second software means tracking at least one of the following pieces of information about messages from senders:
  a) a total number of messages sent;

b) a total number of messages sent over a first predetermined time period;

c) a total number of messages sent to recipients in the network who have included the sender on a whitelist;

d) a number of messages sent to recipients in the network who have included the sender on the whitelist over a second predetermined time period;

e) a number of recipients who have included the sender on the recipient's whitelist;

f) a total number of times a recipient changed a sender's whitelist/blacklist status;

g) a number of times a recipient changed a sender's whitelist/blacklist status over a third predetermined time period;

h) a total number of messages sent to recipients in the network who have not included the sender on the whitelist;

i) a number of messages sent to recipients in the network who have not included the sender on the whitelist over a fourth predetermined time period;

j) a total number of unique recipients in the network who have received at least one message from the sender;

k) a total number of messages sent to unique recipients in the network who have included the sender on the whitelist; and l) a total number of messages sent to unique recipients in the network who have not included the sender on the wherein the sender is identified by one of the group consisting of the actual sender, the final IP address, the final domain name, or the IP path used to send the message.

48. The system of claim 38 wherein compiling statistics about senders includes at least one of the following:

a) determining a ratio of a first number e-mail messages sent by a sender to recipients in the network who have included the sender on a whitelist in a predetermined time period divided by a second number of e-mail messages sent by the sender to users in the network in the predetermined time period;

b) determining a ratio of a first number of recipients in the network who have included the sender on the whitelist divided by a second number of unique recipients in the network who received s-mails from the sender in a predetermined time period;

c) determining a ratio of a first number of times in a predetermined time interval a message from the sender was moved from a whitelist to a blacklist divided by a second number of times a message from the sender was moved from a whitelist to a blacklist;

d) determining a ratio of a first number of times in a predetermined time interval a message from the sender was moved from a blacklist to a whitelist divided by a second number of times a message from the sender was moved from a blacklist to a whitelist;

e) determining a ratio of a first number of unique users within the network who whitelisted the sender within a predetermined time period compared to a second number of unique users within the network who blacklisted the sender within the predetermined time period; f) determining a ratio reflecting a first number of wanted messages sent by the sender compared to a second number of unwanted or total messages sent by the sender;

g) determining a difference between a first number of expected messages sent by the sender and a second number of unexpected messages sent by the sender;

h) determining a difference between a first number of times a user whitelisted a message from the sender and a second number of times a user blacklisted a message from the sender; and i) determining a difference reflecting whether the sender sends a majority of messages to known recipients, wherein the sender is identified by one of the group consisting of the actual sender, the final IP address, the final domain name, or the IP path used to send the message.

49. The system of claim 32 further comprising the first software means placing a message which is not allowed through the e-mail filter in a spam folder.

50. The system of claim 49 further comprising the second software means monitoring the spain folder at predetermined intervals to determine whether messages in the folder should be released because the reputation of the sender has changed.

51. The system of claim 50 further comprising the second software means monitoring the inbox at predetermined intervals to determine whether messages should remain in the inbox.

52. The system of claim 38 further comprising the second software means maintaining at the database at least four of the following values:

a) a number of messages which were explicitly ranked good;

b) a number of messages which were implicitly ranked good;

c) a number of messages whose ranking is unknown;

d) a number of messages which were explicitly ranked bad; and e) a number of messages which were implicitly ranked bad;

wherein the values are based on messages having the same information about the sender including one of the following:

a) the actual sender;

b) a final IP address used by the sender;

c) a final domain name used by the sender; or d) an IP path used by the sender.

53. The system of claim 52 wherein the values represent one of the following:

a) message counts; or b) ratings of unique users within the network.

54. The system of claim 53 further comprising the second software means returning at least four of the values being to the recipient to allow the recipient to apply different weights to a message in order to categorize the message.

55. The system of claim 38 further comprising a third software means tracking local statistics about senders identified by data in the message header at a local database.

56. The system of claim 38 further comprising the second software means assessing the reputation of the sender of a received message when user activity is observed.

57. The system of claim 38 further comprising the second software means sending recipients a notification when any sender's reputation changes.

58. The system of claim 57 further comprising the first software means reviewing all messages received in a predetermined time period preceding receipt of the notification and updating the categorization of the message as necessary.

59. In a network, a system for processing e-mail messages comprising:

a database in network communication with a plurality of recipients of e-mail messages, each of the recipients having a first software means for filtering received e-mail messages, the database having a second software means for performing the following:
  i) receiving information about e-mail messages from the recipients of the messages, wherein the information received includes:
    A) an identification of a sender of a first message based on data in the message header including at least one of the following:
      I) an actual sender;
      II) a final IP address used by the sender;
      III) a final domain name used by the sender; or
      IV) an IP path used by the sender; and
    B) an indication of whether the recipient classified the first message as good or bad;
  ii) compiling statistics for senders of messages, the statistics including a total number of messages sent to unique recipients in the network who have included the sender on a whitelist, wherein the statistics are used to determine a sender's reputation for sending good messages; and
  iii) creating a list of senders with good reputations that may be referenced by recipients of messages from unknown senders in the network, wherein a second message from one sender on the list is allowed through the recipient's first software means for filtering received messages and a third message from another sender not on the list is not allowed through the recipient's first software means for filtering received messages.

60. The system of claim 59 wherein the at least one database includes one of the following:
  a) a central database; or
  b) at least two centrally-maintained databases, each storing and compiling different information and statistics.

61. The system of claim 59 wherein the at least one database and the plurality of recipients are members of an e-mail network.

62. The system of claim 59 further comprising an incoming mail server in network connection with each of the plurality of recipients.

63. The system of claim 59 wherein the actual sender is identified by a signature having at least two of the following fields from the message header:
  a) an e-mail address used by the sender;
  b) a display name used by the sender;
  c) a domain name used by the sender;
  d) a final IP address used by the sender;
  e) a final domain name used by the sender;
  f) a user-agent;
  g) a timezone;
  h) a source IP address;
  i) a name of client software used by the sender;
  j) a sendmail version used by a first receiver; and
  k) an IP path used to route the message.

64. The system of claim. 59 wherein the actual sender is identified by a signature including a range of IP addresses and at least one of the following fields from the message header:
  a) an e-mail address used by the sender;
  b) a display name used by the sender;
  c) a domain name used by the sender;
  d) the final IP address used by the sender;
  e) the final domain name used by the sender;
  f) the name of client software used by the actual sender;
  g) user-agent;
  h) timezone;
  i) source IP address;
  j) sendmail version used by a first receiver; and
  k) the IP path used to route the message.

65. The system of claim 59 further comprising the second software means using statistics compiled at the at least one database to determine a sender's reputation.

66. The system of claim 65 further comprising adding a sender to the list when the sender's reputation passes a predetermined threshold indicating a good reputation.

67. The system of claim 65 further comprising removing a sender from the list when the sender's reputation is below a predetermined threshold indicating a good reputation.

68. The system of claim 59 further comprising the second software means tracking at least one of the following pieces of information about messages from senders:
  a) a total number of messages sent;
  b) a total number of messages sent over a first predetermined time period;
  c) a total number of messages sent to recipients in the network who have included the sender on a whitelist;
  d) a number of messages sent to recipients in the network who have included the sender on the whitelist over a second predetermined time period;
  e) a number of recipients who have included the sender on the recipient's whitelist;
  f) a total number of times a recipient changed a sender's whitelist/blacklist status;
  g) a number of times a recipient changed a sender's whitelist/blacklist status over a third predetermined time period;
  h) a total number of messages sent to recipients in the network who have not included the sender on the whitelist;
  i) a number of messages sent to recipients in the network who have not included the sender on the whitelist over a fourth predetermined time period;
  j) a total number of unique recipients in the network who have received at least one message from the sender; and
  k) a total number of messages sent to unique recipients in the network who have not included the sender on the whitelist,
  wherein the sender is identified by one of the group consisting of the actual sender, the final IP address, the final domain name, or the IP path used to send the message.

69. The system of claim 59 wherein compiling statistics about senders includes at least one of the following:
  a) determining a ratio of a first number e-mail messages sent by a sender to recipients in the network who have included the sender on a whitelist in a predetermined time period divided by a second number of e-mail messages sent by the sender to users in the network in the predetermined time period;
  b) determining a ratio of a first number of recipients in the network who have included the sender on the whitelist divided by a second number of unique recipients in the network who received e-mails from the sender in a predetermined time period;
  c) determining a ratio of a first number of times in a predetermined time interval a message from the sender was moved from a whitelist to a blacklist divided by a second number of times a message from the sender was moved from a whitelist to a blacklist;
  d) determining a ratio of a first number of times in a predetermined time interval a message from the sender was moved from a blacklist to a whitelist divided by a second number of times a message from the sender was moved from a blacklist to a whitelist;

e) determining a ratio of a first number of unique users within the network who whitelisted the sender within a predetermined time period compared to a second number of unique users within the network who blacklisted the sender within the predetermined time period;

f) determining a ratio reflecting whether the sender sends a majority of messages to recipients who have included the sender on the whitelist;

g) determining a ratio reflecting a first number of wanted messages sent by the sender compared to a second number of unwanted or total messages sent by the sender;

h) determining a difference between a first number of expected messages sent by the sender and a second number of unexpected messages sent by the sender;

i) determining a difference between a first number of times a user whitelisted a message from the sender and a second number of times a use-n blacklisted a message from the sender; and j) determining a difference reflecting whether the sender sends a majority of messages to known recipients.

wherein the sender is identified by one of the group consisting of the actual sender, the final IP address, the final domain name, or the IP path used to send the message.

70. The system of claim 59 further composing the first software means placing a message which is not allowed through the e-mail filter in a spam folder.

71. The system of claim 70 further comprising the second software means monitoring the spam folder at predetermined intervals to determine whether messages in the folder should be released because the reputation of the sender has changed.

72. The system of claim 59 further comprising the second software means monitoring the inbox at predetermined intervals to determine whether messages should remain in the inbox.

73. The system of claim 59 further comprising the second software means maintaining at the database at least four of the following values;

a) a number of messages which were explicitly ranked good;

b) a number of messages which were implicitly ranked good;

c) a number of messages whose ranking is unknown;

d) a number of messages which were explicitly ranked bad; and e) a number of messages which were implicitly ranked bad;

wherein the values are based on messages having the same information about the sender including one of the following:

a) the signature;

b) a final IP address used by the sender;

c) a final domain name used by the sender; or d) an IP path used by the sender.

74. The system of claim 73 wherein the values represent one of the following:

a) message counts; or b) ratings of unique users within the network.

75. The system of claim 59 further comprising a third software means tracking local statistics about senders identified by data in the message header at a local database.

76. The system of claim 59 further comprising the second software means assessing the reputation of the sender of a received message when user activity is observed.

77. The system of claim 59 further comprising the second software means sending recipients a notification when any sender's reputation changes.

78. The system of claim 77 further comprising the first software means reviewing all messages received in a predetermined time period preceding receipt of the notification and updating the categorization of the message as necessary.

* * * * *

UNITED STATES PATENT AND TRADEMARK OFFICE
CERTIFICATE OF CORRECTION

| | | |
|---|---|---|
| PATENT NO. | : 7,206,814 B2 | |
| APPLICATION NO. | : 10/683598 | |
| DATED | : April 17, 2007 | |
| INVENTOR(S) | : Steven T. Kirsch | |

It is certified that error appears in the above-identified patent and that said Letters Patent is hereby corrected as shown below:

In the claims:

1) Column 24, claim 28, lines 14-15:

"...predetermined Lime period divided..." should read:

--...predetermined time period divided...--

2) Column 28, claim 49, line 1:

"The system of claim 32 further..." should read:

--The system of claim 38 further...--

3) Column 28, claim 50, line 15:

"...monitoring the spain folder at..." should read:

--...monitoring the spam folder at...--

4) Column 31, claim 69(i), line 18:

"...number of times a use-n blacklisted..." should read:

--...number of times a user blacklisted...--

UNITED STATES PATENT AND TRADEMARK OFFICE
CERTIFICATE OF CORRECTION

PATENT NO.       : 7,206,814 B2
APPLICATION NO.  : 10/683598
DATED            : April 17, 2007
INVENTOR(S)      : Steven T. Kirsch It is certified that error appears in the above-identified patent and that said Letters Patent is hereby corrected as shown below:

5) Column 31, claim 70, line 26:

"...claim 59 further composing..." should read:

--...claim 59 further comprising...--

Signed and Sealed this

Twenty-fourth Day of March, 2009

JOHN DOLL
*Acting Director of the United States Patent and Trademark Office*